US009846776B1

United States Patent
Paithane et al.

(10) Patent No.: US 9,846,776 B1
(45) Date of Patent: *Dec. 19, 2017

(54) SYSTEM AND METHOD FOR DETECTING FILE ALTERING BEHAVIORS PERTAINING TO A MALICIOUS ATTACK

(71) Applicant: FireEye, Inc., Milpitas, CA (US)

(72) Inventors: Sushant Paithane, Sunnyvale, CA (US); Sai Vashist, Union City, CA (US); Raymond Yang, Fremont, CA (US); Yasir Khalid, Fremont, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/339,459

(22) Filed: Oct. 31, 2016

Related U.S. Application Data

(63) Continuation of application No. 14/675,648, filed on Mar. 31, 2015, now Pat. No. 9,483,644.

(51) Int. Cl.
*G06F 21/56* (2013.01)
*G06F 17/30* (2006.01)

(52) U.S. Cl.
CPC ...... *G06F 21/566* (2013.01); *G06F 17/30088* (2013.01); *G06F 17/30123* (2013.01); *G06F 17/30144* (2013.01); *G06F 2221/031* (2013.01)

(58) Field of Classification Search
CPC ............... G06F 21/56; G06F 17/30144; G06F 2221/034
See application file for complete search history.

(56) References Cited

U.S. PATENT DOCUMENTS

| 4,292,580 A | 9/1981 | Ott et al. |
| 5,175,732 A | 12/1992 | Hendel et al. |

(Continued)

FOREIGN PATENT DOCUMENTS

| GB | 2439806 A | 1/2008 |
| GB | 2490431 A | 10/2012 |

(Continued)

OTHER PUBLICATIONS

William Martin, "Honey Pots and Honey Nets—Security Through Deception", Retrieved From https://www.sans.org/reading-room/whitepapers/attacking/honeypots-honey-nets-security-deception-41, Published May 25, 2001.*

(Continued)

*Primary Examiner* — Chau Le
(74) *Attorney, Agent, or Firm* — Rutan & Tucker, LLP

(57) ABSTRACT

According to one embodiment, a computerized method for detecting malware is described. The method includes receiving configuration information that identifies (i) at least one type of lure data and (ii) one or more locations of a system operating within a virtual machine for placement of the lure data into the system. The lure data is configured to entice interaction of the lure data by malware associated with an object under analysis. Thereafter, the lure data is placed within the system according to the configuration information and lure data information is selectively modified. The information may include a name or content within a directory including the lure data. During processing of an object within the virtual machine, a determination is made whether the object exhibits file altering behavior based on a comparison of actions performed that are associated with the lure data and one more known file activity patterns.

37 Claims, 10 Drawing Sheets

(56) References Cited

U.S. PATENT DOCUMENTS

| | | |
|---|---|---|
| 5,278,901 A | 1/1994 | Shieh et al. |
| 5,440,723 A | 8/1995 | Arnold et al. |
| 5,452,442 A | 9/1995 | Kephart |
| 5,490,249 A | 2/1996 | Miller |
| 5,657,473 A | 8/1997 | Killean et al. |
| 5,842,002 A | 11/1998 | Schnurer et al. |
| 5,889,973 A | 3/1999 | Moyer |
| 5,960,170 A | 9/1999 | Chen et al. |
| 5,978,917 A | 11/1999 | Chi |
| 6,088,803 A | 7/2000 | Tso et al. |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,072 B2 | 6/2012 | Matulic |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,198 B2 | 10/2012 | Mott et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,240 B2 | 11/2012 | Lorsch |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |

(56) References Cited

U.S. PATENT DOCUMENTS

| | | | |
|---|---|---|---|
| 8,510,842 B2 | 8/2013 | Amit et al. | |
| 8,516,478 B1 | 8/2013 | Edwards et al. | |
| 8,516,590 B1 | 8/2013 | Ranadive et al. | |
| 8,516,593 B2 | 8/2013 | Aziz | |
| 8,522,348 B2 | 8/2013 | Chen et al. | |
| 8,528,086 B1 | 9/2013 | Aziz | |
| 8,533,824 B2 | 9/2013 | Hutton et al. | |
| 8,539,582 B1 | 9/2013 | Aziz et al. | |
| 8,549,638 B2 | 10/2013 | Aziz | |
| 8,555,391 B1 | 10/2013 | Demir et al. | |
| 8,561,177 B1 | 10/2013 | Aziz et al. | |
| 8,566,946 B1 | 10/2013 | Aziz et al. | |
| 8,584,094 B2 | 11/2013 | Dadhia et al. | |
| 8,584,234 B1 | 11/2013 | Sobel et al. | |
| 8,584,239 B2 | 11/2013 | Aziz et al. | |
| 8,595,834 B2 | 11/2013 | Xie et al. | |
| 8,627,476 B1 | 1/2014 | Satish et al. | |
| 8,635,696 B1 | 1/2014 | Aziz | |
| 8,682,054 B2 | 3/2014 | Xue et al. | |
| 8,682,812 B1 | 3/2014 | Ranjan | |
| 8,689,333 B2 | 4/2014 | Aziz | |
| 8,695,096 B1 | 4/2014 | Zhang | |
| 8,713,631 B1 | 4/2014 | Pavlyushchik | |
| 8,713,681 B2 | 4/2014 | Silberman et al. | |
| 8,726,392 B1 | 5/2014 | McCorkendale et al. | |
| 8,739,280 B2 | 5/2014 | Chess et al. | |
| 8,776,229 B1 | 7/2014 | Aziz | |
| 8,782,792 B1 * | 7/2014 | Bodke | G06F 21/53 713/187 |
| 8,789,172 B2 * | 7/2014 | Stolfo | G06F 21/56 380/280 |
| 8,789,178 B2 | 7/2014 | Kejriwal et al. | |
| 8,793,787 B2 * | 7/2014 | Ismael | G06F 21/566 726/1 |
| 8,805,947 B1 | 8/2014 | Kuzkin et al. | |
| 8,806,647 B1 | 8/2014 | Daswani et al. | |
| 8,832,829 B2 | 9/2014 | Manni et al. | |
| 8,850,570 B1 | 9/2014 | Ramzan | |
| 8,850,571 B2 * | 9/2014 | Staniford | H04L 63/1416 713/187 |
| 8,881,234 B2 | 11/2014 | Narasimhan et al. | |
| 8,881,282 B1 | 11/2014 | Aziz et al. | |
| 8,898,788 B1 | 11/2014 | Aziz et al. | |
| 8,935,779 B2 | 1/2015 | Manni et al. | |
| 8,959,428 B2 | 2/2015 | Majidian | |
| 8,984,638 B1 | 3/2015 | Aziz et al. | |
| 8,990,939 B2 | 3/2015 | Staniford et al. | |
| 8,990,944 B1 | 3/2015 | Singh et al. | |
| 8,997,219 B2 | 3/2015 | Staniford et al. | |
| 9,009,822 B1 | 4/2015 | Ismael et al. | |
| 9,009,823 B1 | 4/2015 | Ismael et al. | |
| 9,027,135 B1 | 5/2015 | Aziz | |
| 9,071,638 B1 | 6/2015 | Aziz et al. | |
| 9,104,867 B1 | 8/2015 | Thioux et al. | |
| 9,106,694 B2 | 8/2015 | Aziz et al. | |
| 9,118,715 B2 | 8/2015 | Staniford et al. | |
| 9,159,035 B1 | 10/2015 | Ismael et al. | |
| 9,171,160 B2 | 10/2015 | Vincent et al. | |
| 9,176,843 B1 | 11/2015 | Ismael et al. | |
| 9,189,627 B1 | 11/2015 | Islam | |
| 9,195,829 B1 | 11/2015 | Goradia et al. | |
| 9,197,664 B1 | 11/2015 | Aziz et al. | |
| 9,223,972 B1 | 12/2015 | Vincent et al. | |
| 9,225,740 B1 | 12/2015 | Ismael et al. | |
| 9,241,010 B1 | 1/2016 | Bennett et al. | |
| 9,251,343 B1 | 2/2016 | Vincent et al. | |
| 9,262,635 B2 | 2/2016 | Paithane et al. | |
| 9,282,109 B1 | 3/2016 | Aziz et al. | |
| 9,294,501 B2 | 3/2016 | Mesdaq et al. | |
| 9,300,686 B2 | 3/2016 | Pidathala et al. | |
| 9,306,960 B1 | 4/2016 | Aziz | |
| 9,306,974 B1 | 4/2016 | Aziz et al. | |
| 9,311,479 B1 | 4/2016 | Manni et al. | |
| 2001/0005889 A1 | 6/2001 | Albrecht | |
| 2001/0047326 A1 | 11/2001 | Broadbent et al. | |
| 2002/0018903 A1 | 2/2002 | Kokubo et al. | |
| 2002/0038430 A1 | 3/2002 | Edwards et al. | |
| 2002/0091819 A1 | 7/2002 | Melchione et al. | |
| 2002/0095607 A1 | 7/2002 | Lin-Hendel | |
| 2002/0116627 A1 | 8/2002 | Tarbotton et al. | |
| 2002/0144156 A1 | 10/2002 | Copeland | |
| 2002/0162015 A1 | 10/2002 | Tang | |
| 2002/0166063 A1 | 11/2002 | Lachman et al. | |
| 2002/0169952 A1 | 11/2002 | DiSanto et al. | |
| 2002/0184528 A1 | 12/2002 | Shevenell et al. | |
| 2002/0188887 A1 | 12/2002 | Largman et al. | |
| 2002/0194490 A1 | 12/2002 | Halperin et al. | |
| 2003/0074578 A1 | 4/2003 | Ford et al. | |
| 2003/0084318 A1 | 5/2003 | Schertz | |
| 2003/0101381 A1 | 5/2003 | Mateev et al. | |
| 2003/0115483 A1 | 6/2003 | Liang | |
| 2003/0188190 A1 | 10/2003 | Aaron et al. | |
| 2003/0191957 A1 | 10/2003 | Hypponen et al. | |
| 2003/0200460 A1 | 10/2003 | Morota et al. | |
| 2003/0212902 A1 | 11/2003 | van der Made | |
| 2003/0229801 A1 | 12/2003 | Kouznetsov et al. | |
| 2003/0237000 A1 | 12/2003 | Denton et al. | |
| 2004/0003323 A1 | 1/2004 | Bennett et al. | |
| 2004/0015712 A1 | 1/2004 | Szor | |
| 2004/0019832 A1 | 1/2004 | Arnold et al. | |
| 2004/0047356 A1 | 3/2004 | Bauer | |
| 2004/0083408 A1 | 4/2004 | Spiegel et al. | |
| 2004/0088581 A1 | 5/2004 | Brawn et al. | |
| 2004/0093513 A1 | 5/2004 | Cantrell et al. | |
| 2004/0111531 A1 | 6/2004 | Staniford et al. | |
| 2004/0117478 A1 | 6/2004 | Triulzi et al. | |
| 2004/0117624 A1 | 6/2004 | Brandt et al. | |
| 2004/0128355 A1 | 7/2004 | Chao et al. | |
| 2004/0128529 A1 * | 7/2004 | Blake | H04L 63/1491 726/25 |
| 2004/0165588 A1 | 8/2004 | Pandya | |
| 2004/0236963 A1 | 11/2004 | Danford et al. | |
| 2004/0243349 A1 | 12/2004 | Greifeneder et al. | |
| 2004/0249911 A1 | 12/2004 | Alkhatib et al. | |
| 2004/0255161 A1 | 12/2004 | Cavanaugh | |
| 2004/0268147 A1 | 12/2004 | Wiederin et al. | |
| 2005/0005159 A1 | 1/2005 | Oliphant | |
| 2005/0021740 A1 | 1/2005 | Bar et al. | |
| 2005/0033960 A1 | 2/2005 | Vialen et al. | |
| 2005/0033989 A1 | 2/2005 | Poletto et al. | |
| 2005/0050148 A1 | 3/2005 | Mohammadioun et al. | |
| 2005/0086523 A1 | 4/2005 | Zimmer et al. | |
| 2005/0091513 A1 | 4/2005 | Mitomo et al. | |
| 2005/0091533 A1 | 4/2005 | Omote et al. | |
| 2005/0091652 A1 | 4/2005 | Ross et al. | |
| 2005/0108562 A1 | 5/2005 | Khazan et al. | |
| 2005/0114663 A1 | 5/2005 | Cornell et al. | |
| 2005/0125195 A1 | 6/2005 | Brendel | |
| 2005/0149726 A1 | 7/2005 | Joshi et al. | |
| 2005/0157662 A1 | 7/2005 | Bingham et al. | |
| 2005/0183143 A1 | 8/2005 | Anderholm et al. | |
| 2005/0201297 A1 | 9/2005 | Peikari | |
| 2005/0210533 A1 | 9/2005 | Copeland et al. | |
| 2005/0238005 A1 | 10/2005 | Chen et al. | |
| 2005/0240781 A1 | 10/2005 | Gassoway | |
| 2005/0262562 A1 | 11/2005 | Gassoway | |
| 2005/0265331 A1 | 12/2005 | Stolfo | |
| 2005/0283839 A1 | 12/2005 | Cowburn | |
| 2006/0010495 A1 | 1/2006 | Cohen et al. | |
| 2006/0015416 A1 | 1/2006 | Hoffman et al. | |
| 2006/0015715 A1 | 1/2006 | Anderson | |
| 2006/0015747 A1 | 1/2006 | Van de Ven | |
| 2006/0021029 A1 | 1/2006 | Brickell et al. | |
| 2006/0021054 A1 | 1/2006 | Costa et al. | |
| 2006/0031476 A1 | 2/2006 | Mathes et al. | |
| 2006/0047665 A1 | 3/2006 | Neil | |
| 2006/0070130 A1 | 3/2006 | Costea et al. | |
| 2006/0075496 A1 | 4/2006 | Carpenter et al. | |
| 2006/0095968 A1 | 5/2006 | Portolani et al. | |
| 2006/0101516 A1 | 5/2006 | Sudaharan et al. | |
| 2006/0101517 A1 | 5/2006 | Banzhof et al. | |
| 2006/0117385 A1 | 6/2006 | Mester et al. | |
| 2006/0123477 A1 | 6/2006 | Raghavan et al. | |
| 2006/0143709 A1 | 6/2006 | Brooks et al. | |

(56) References Cited

U.S. PATENT DOCUMENTS

| | | |
|---|---|---|
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0190561 A1 | 8/2006 | Conboy et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2007/0289015 A1* | 12/2007 | Repasi .................. G06F 21/56 726/22 |
| 2008/0005782 A1 | 1/2008 | Aziz |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0181227 A1 | 7/2008 | Todd |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192057 A1 | 7/2010 | Majidian |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0275210 A1 | 10/2010 | Phillips et al. |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |

(56) References Cited

U.S. PATENT DOCUMENTS

| | | |
|---|---|---|
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173178 A1 | 7/2011 | Conboy et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1* | 12/2011 | Kaplan ............... H04L 63/0227 726/23 |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1* | 3/2012 | Thomas ............... G06F 21/55 726/24 |
| 2012/0084859 A1 | 4/2012 | Radinsky et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0181975 A1 | 6/2014 | Spernow et al. |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0325344 A1 | 10/2014 | Bourke et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0220735 A1 | 8/2015 | Paithane et al. |
| 2015/0372980 A1 | 12/2015 | Eyada |
| 2016/0044000 A1 | 2/2016 | Cunningham |
| 2016/0127393 A1 | 5/2016 | Aziz et al. |

FOREIGN PATENT DOCUMENTS

| | | |
|---|---|---|
| WO | 0206928 | 1/2002 |
| WO | 0223805 A2 | 3/2002 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

Marchette, David J., Computer Intrusion Detection and Network Monitoring: A Statistical ("Marchette"), (2001).

Margolis, P.E., "Random House Webster's 'Computer & Internet Dictionary 3rd Edition", ISBN 0375703519, p. 595 (Dec. 1998).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SandBoxII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

(56) References Cited

OTHER PUBLICATIONS

Newsome, J., et al., "Polygraph: Automatically Generating Signatures for Polymorphic Worms", In Proceedings of the IEEE Symposium on Security and Privacy, (May 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.-N-Version Antivirus in the Network Cloud, 17th USENIX Security Symposium USENIX Security '08 Jul. 28-Aug. 1, 2008 San Jose, CA.
PCT/US2014/043726 filed Jun. 23, 2014 International Search Report and Written Opinion dated Oct. 9, 2014.
PCT/US2015/067082 filed Dec. 21, 2015 International Search Report and Written Opinion dated Feb. 24, 2016.
Peter M. Chen, and Brian D. Noble, "When Virtual is Better Than Real, Department of Electrical Engineering and Computer Science", University of Michigan ("Chen"), (2001).
Reiner Sailer, Enriquillo Valdez, Trent Jaeger, Roonald Perez, Leendert van Doom, John Linwood Griffin, Stefan Berger., sHype: Secure Hypervisor Approach to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Spitzner, Lance, "Honeypots: Tracking Hackers", ("Spizner"), (Sep. 17, 2002).
The Sniffers's Guide to Raw Traffic available at: yuba.stanford.edu/~casado/pcap/sectionl.html, (Jan. 6, 2014).
Thomas H. Ptacek, and Timothy N. Newsham, "Insertion, Evasion, and Denial of Service: Eluding Network Intrusion Detection", Secure Networks, ("Ptacek"), (Jan. 1998).
U.S. Appl. No. 11/717,475. filed Mar. 12, 2007 Final Office Action dated Feb. 27, 2013.
U.S. Appl. No. 11/717,475, filed Mar. 12, 2007 Final Office Action dated Nov. 22, 2010.
U.S. Appl. No. 11/717,475, filed Mar. 12, 2007 Non-Final Office Action dated Aug. 28, 2012.
U.S. Appl. No. 11/717,475, filed Mar. 12, 2007 Non-Final Office Action dated May 6, 2010.
U.S. Appl. No. 13/925,688, filed Jun. 24, 2013 Final Office Action dated Jan. 12, 2017.
U.S. Appl. No. 13/925,688, filed Jun. 24, 2013 Final Office Action dated Mar. 11, 2016.
U.S. Appl. No. 13/925,688, filed Jun. 24, 2013 Non-Final Office Action dated Jun. 2, 2015.
U.S. Appl. No. 13/925,688, filed Jun. 24, 2013 Non-Final Office Action dated Sep. 16, 2016.
U.S. Appl. No. 14/059,381, filed Oct. 21, 2013 Non-Final Office Action dated Oct. 29, 2014.
U.S. Appl. No. 14/620,060, filed Feb. 11, 2015, Non-Final Office Action dated Apr. 3, 2015.
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Venezia, Paul, "NetDetector Captures Intrusions", InfoWorld Issue 27, ("Venezia"), (Jul. 14, 2003).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Mathew M., "Throttling Virses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
"Network Security: NetDetector—Network Intrusion Forensic System (NIFS) Whitepaper", ("NetDetector Whitepaper"), (2003).
"Packet", Microsoft Computer Dictionary Microsoft Press, (Mar. 2002), 1 page.
"When Virtual is Better Than Real", IEEEXplore Digital Library, available at, http://ieeexplore.ieee.org/xpl/articleDetails.iso?reload=true&arnumber=990073, (Dec. 7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye") (Sep. 2003).
Adobe Systems Incorporated, "PDF 32000-1:2008, Document management—Portable document format—Part1:PDF 1.7", First Edition, Jul. 1, 2008, 756 pages.
AltaVista Advanced Search Results (subset). "attack vector identifier" Http://www.altavista.com/web/results?Itag=ody&pg=aq&aqmode=aqa=Event+Orchestrator . . . , (Accessed on Sep. 15, 2009).
AltaVista Advanced Search Results (subset). "Event Orchestrator". Http://www.altavista.com/web/results?Itag=ody&pg=aq&aqmode=aqa=Event+Orchesrator . . . , (Accessed on Sep. 3, 2009).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlaq Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Virol, Springer-Verlag, France., (2006), pp. 67-77.
Boubalos, Chris, "extracting syslog data out of raw pcap dumps, seclists.org, Honeypots mailing list archives", available at http://seclists,org/honeypots/2003/q2/319 ("Boubalos"), (Jun. 5, 2003).
Bowen, B. M. et al " BotSwindler: Tamper Resistant Injection of Believable Decoys in VM-Based Hosts for Crimeware Detection", in Recent Advances in Intrusion Detection, Springer ISBN: 978-3-642-15511-6 (pp. 118-137) (Sep. 15, 2010).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Cisco "Intrusion Prevention for the Cisco ASA 5500-x Series" Data Sheet (2012).
Cisco, Configuring the Catalyst Switched Port Analyzer (SPAN) ("Cisco"), (1992-2003).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I., "PyFlag—An advanced network forensic framework", Digital investigation 5, Elsevier, (2008), pp. S112-S120.
Costa, M., et al., "Vigilante: End-to-End Containment of Internet Worms", SOSP '05 Association for Computing Machinery, Inc., Brighton U.K., (Oct. 23-26, 2005).
Crandall, J.R., et al., "Minos:Control Data Attack Prevention Orthogonal to Memory Model", 37th International Symposium on Microarchitecture, Portland, Oregon, (Dec. 2004).

(56) References Cited

OTHER PUBLICATIONS

Deutsch, P., ""Zlib compressed data format specification version 3.3" RFC 1950, (1996)".
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric , et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase © CMU, Carnegie Mellon University, 2007.
Hjelmvik, Erik, "Passive Network Security Analysis with NetworkMiner", (IN)SECURE, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results (subset) for "detection of unknown computer worms". Http//ieeexplore.ieee.org/searchresult.jsp?SortField=Score&SortOrder=desc&ResultC . . . (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (Dec. 2002).
Kasnyansky, Max, et al., Universal TUN/TAP driver, available at https://www.kernel.org/doc/Documentation/networking/tuntap.txt (2002) ("Krasnyansky").
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Liljenstam, Michael, et al., "Simulating Realistic Network Traffic for Worm Warning System Design and Testing", Institute for Security Technology studies, Dartmouth College, ("Liljenstam"), (Oct. 27, 2003).
Lindorfer, Martina, Clemens Kolbitsch, and Paolo Milani Compare& "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12--final107.pdf [retrieved on Dec. 15, 2014].

\* cited by examiner

SYSTEM AND METHOD FOR DETECTING FILE ALTERING BEHAVIORS PERTAINING TO A MALICIOUS ATTACK

CROSS-REFERENCE TO RELATED APPLICATION

This Patent Application is a continuation application of U.S. patent application Ser. No. 14/675,648 filed Mar. 31, 2015, now U.S. Pat. No. 9,483,644, the entire contents of all of which are incorporated herein by reference.

FIELD

Embodiments of the disclosure relate to the field of cyber security. More specifically, embodiments of the disclosure relate to a system for detecting anomalous, or more specifically, malicious behavior using one or more lure files and a file system within a virtual machine.

GENERAL BACKGROUND

Over the last decade, malicious software has become a pervasive problem for Internet users as many networked resources include vulnerabilities that are subject to attack. For instance, over the past few years, more and more vulnerabilities are being discovered in software that is loaded onto endpoint devices present on a network. These vulnerabilities may be exploited by allowing a third-party, e.g., through computer software, to gain access to one or more areas within the network not typically accessible. For example, a third-party may exploit a software vulnerability to gain unauthorized access to email accounts and/or data files.

While some software vulnerabilities continue to be addressed through software patches, prior to the release of such software patches, network devices will continue to be targeted for attack by exploits, namely malicious computer code that attempts to acquire sensitive information, adversely influence, or attack normal operations of the network device or the entire enterprise network by taking advantage of a vulnerability in computer software. Herein, a network device may be any device with data processing and network connectivity such as, for example, a security appliance, a server, a mainframe, a computer such as a desktop or laptop, netbook, tablet, firewall, smart phone, router, switch, bridge, etc.

In particular, one type of malware may exhibit behaviors such as infecting, encrypting, deleting and/or stealing files (hereinafter generally referred to as "file altering malware"). File altering malware targets computer systems in order to, at least, (i) restrict access to one or more portions of a computer system and demand a payment for the removal of the restriction (e.g., in some instances, file altering malware may encrypt files within the computer system and in other instances, may prohibit access to the entire computer system) or (ii) infect computer systems with information theft routines, which may seek to steal information such as (1) login credentials to one or more applications (e.g., Microsoft® Outlook, Google® Chrome, Spotify, etc.), (2) system information (e.g., Windows product keys, volume serial numbers, etc.), (3) file transport protocol (FTP) credentials, or the like.

In some instances, file altering malware may enter a computer system, for example, when a user of an endpoint device activates a uniform resource locator (URL) in an Internet-browser application or downloads a file from a network or opens an e-mail attachment. Subsequently, the file altering malware may alter various files within the computer, which may include encrypting one or more files thereby restricting access to the one or more files. The file altering malware may then request a payment for a key to decrypt one or more files.

In some cases, the file altering malware may target particular data storage locations, such as files and/or folders containing sensitive personal or corporate information, financial information or even content related to military services. Targeting particular files and/or folders containing sensitive information creates a sense of urgency with the user of the infected endpoint device and/or a corporation associated with the infected endpoint device to adhere to the requests of the malware writers.

Currently, malware detection systems attempting to detect file altering malware have difficulty identifying files affected by file altering malware, as non-malicious applications may affect files and folders in a similar manner as file altering malware. For example, non-malicious file scanners or non-malicious encryption programs may, for example, open, rename, encrypt and/or password protect the same files and/or folders affected by file altering malware (e.g., files and/or folders containing sensitive information). In one example, a corporation deploying an enterprise network may propagate updates to a file encryption program that is intended to encrypt particular directories within a file system on each endpoint device (e.g., a "My Documents" directory on all corporate computers). Upon receiving the updates and launching the corporate-approved file encryption program, current malware detection systems cannot distinguish between the approved file encryption program and file altering malware. Therefore, current malware detection systems may return numerous false-positives and/or false-negatives.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
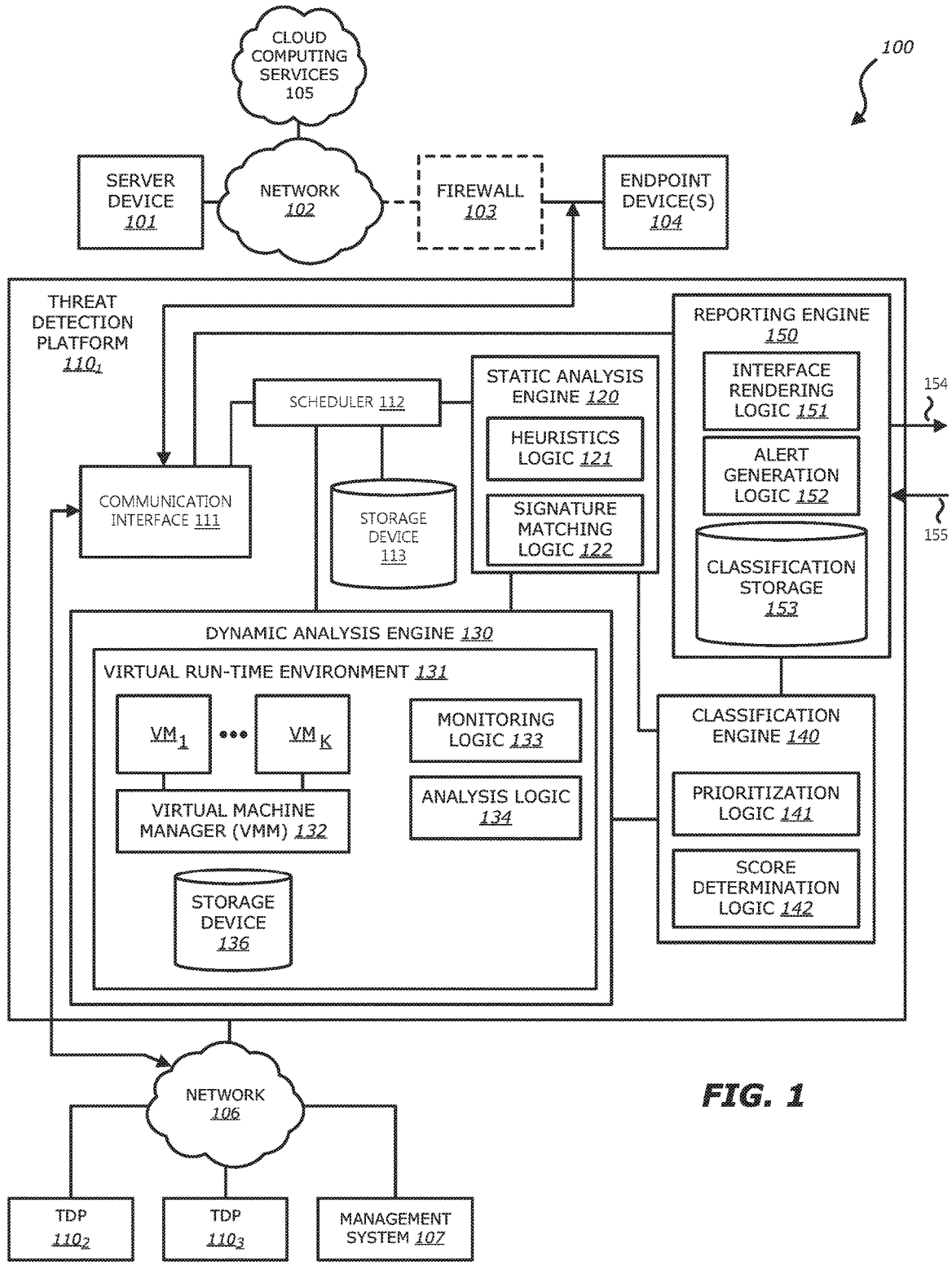
FIG. 1 is an exemplary block diagram of a network deploying a plurality of threat detection platforms (TDPs) deploying the invention.

Various embodiments of the disclosure relate to a threat detection platform (TDP) that improves malware detection, particularly, in the case of malware including file altering malware. In one embodiment of the disclosure, the TDP determines whether an object is associated with a malicious attack involving file altering malware through a dynamic analysis of an object within a virtual run-time environment. Herein, the virtual run-time environment features one or more virtual machine instances (VMs), which may be provisioned with a guest image associated with a prescribed software profile. Each guest image may include a software application and/or an operating system (OS). Each guest image may further include one or more monitors, namely software components that are configured to observe and capture run-time behavior of an object under analysis during processing within the virtual machine. In another embodiment, the TDP may also perform a static analysis of the object (e.g., rules-based analysis using heuristics and/or comparisons of one or more signatures).

Herein, each of the VMs may be configured with a guest image to simulate a particular endpoint device. Specifically, each VM may be configured with different operating systems, different applications, different versions of a common operating system and/or different versions of a common application. Additionally, each VM may include a file system that is monitored during the dynamic processing. Herein, one or more lure configuration files may be provided to the virtual run-time environment, wherein the configuration files set-forth information that enables each VM to configure the file system therein. For example, a lure configuration file may include, but is not limited or restricted to, the number of lure files that are to be placed in the file system prior to processing the object, the location of the placement of each of the lure files, time and date information for each VM, etc. Additionally, one or more lure files may be provided to each VM to be added to its file system. Alternatively, each VM may generate one or more lure files according to the information set forth in the lure configuration file.

In one embodiment, the TDP may receive an object via a network connection and one or more VMs may perform a dynamic analysis on the object to determine whether the object is associated with malware, particularly file altering malware. Specifically, a method for analyzing an object with the TDP may be divided into three phases: (A) an installation phase; (B) a configuration phase; and (C) a processing and analysis phase.

The installation phase includes receiving, at least, a lure configuration file, identifying lure file types and locations in the file system for which to place the lure files, generating the lure files (if not provided), and placing the lure files in the file system. The configuration phase may include, at least, receiving an object to analyze, selectively modifying the file names and/or content of one or more lure files (e.g., generating random or pseudo-random file names for the lure files and, optionally, randomizing or pseudo-randomizing the lure file contents). Third, the processing and analysis phase may include capturing a snapshot of the file system prior to processing the object; processing the object, monitoring (i) the actions performed during processing associated with one or more of the lure files and (ii) changes to the file system; and analyzing, at least, the changes to determine whether the object exhibits file altering behavior. Optionally, a determination of the malware family to which the malware belongs may be made (e.g., an object may be sub-classified as an infector, stealer, cryptor or destructor). Additionally, and also optionally, an alert may be generated detailing the detection of the file altering malware. Throughout the specification, claims and figures, the term "network traffic" will be used in the discussion but any form of incoming data may be substituted.

Herein, the phrase, "actions performed during processing associated with one or more of the lure files," should be understood as being any direct or indirect interaction with the lure file. Additionally, hereinafter, the phrase "changes to the file system" should be interpreted as meaning one or more actions performed during processing of the object inclusive of changes to the file system.

I. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic link library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

An "exploit" may be construed broadly as information (e.g., executable code, data, command(s), etc.) that attempts to take advantage of a software vulnerability and/or an action by a person gaining unauthorized access to one or more areas of a network device to cause the network device to experience undesirable or anomalous behaviors. The undesirable or anomalous behaviors may include a communication-based anomaly or an execution-based anomaly, which, for example, could (1) alter the functionality of an network device executing application software in an atypical manner (a file is opened by a first process where the file is configured to be opened by a second process and not the first process); (2) alter the functionality of the network device executing that application software without any malicious intent; and/or (3) provide unwanted functionality which may be generally acceptable in another context.

According to one embodiment, "malware" may be construed broadly as computer code that executes an exploit to take advantage of a vulnerability, for example, to harm or co-opt operation of a network device or misappropriate, modify or delete data. Conventionally, malware is often said to be designed with malicious intent. Hereinafter, reference to "malware" includes malware and/or exploits.

The term "object" generally refers to a collection of data, whether in transit (e.g., over a network) or at rest (e.g., stored), often having a logical structure or organization that enables classification for purposes of analysis. During analysis, for example, the object may exhibit a set of expected characteristics and, during processing, a set of expected behaviors. The object may also exhibit a set of unexpected characteristics and a set of unexpected behaviors that may evidence the presence of malware and potentially allow the object to be classified as malicious, and more specifically, as file altering malware. One type of object is a "file" that constitutes a self-contained collection of data having a logical structure or organization that enables classification for purposes of analysis. A second example of an object is a "flow" generally refers to related packets that are received, transmitted, or exchanged within a communication session. For convenience, a packet is broadly referred to as a series of bits or bytes having a prescribed format, which may, according to one embodiment, include packets, frames, or cells. Further, an "object" may also refer to collective payloads of a number of related packets, e.g., a single webpage received over a network.

As an illustrative example, a file may be a self-contained element, where different types of such files may include, for example, an executable file, non-executable file, a document (for example, a Microsoft Office® document), a dynamically linked library (DLL), a Portable Document Format (PDF) document, Zip file, a Flash Video (FLV) file, an electronic mail (email) message or a HyperText Markup Language (HTML) file.

The term "file system" may refer to any structural system for storing, organizing and/or retrieving data. Various file systems may be structured according to various structural and logical rules for storing, organizing and/or retrieving data. Examples of file systems may include, but are not limited or restricted to, disk file systems (File Allocation Table (FAT), New File Technology File System (NTFS), Universal Disk Format (UDF), ZFS, etc.), optical disk file systems, flash file systems and/or database file systems (wherein segments of data may be additionally stored, organized and/or retrieved according to one or more characteristics).

A "platform" generally refers to an electronic device with network connectivity that typically includes a housing that protects, and sometimes encases, circuitry with data processing and/or data storage. Examples of a platform may include a server or an endpoint device that may include, but is not limited or restricted to a stationary or portable computer including a desktop computer, laptop, electronic reader, netbook or tablet; a smart phone; a video-game console; or wearable technology (e.g., watch phone, etc.).

The terms "suspicious" and "malicious" may both represent a probability (or level of confidence) that the object is associated with a malicious attack. For instance, the probability may be based, at least in part, on (i) pattern matches; (ii) analyzed deviations in messaging practices set forth in applicable communication protocols, e.g., HTTP, TCP, etc.); (iii) analyzed compliance with certain message formats established for the protocol (e.g., out-of-order commands); (iv) analyzed header or payload parameters to determine compliance, (v) attempts to communicate with external servers during dynamic processing, and/or (vi) attempts to access predetermined (e.g., secure) locations in memory during dynamic processing.

The term "snapshot" should be interpreted as the capturing of the state of a file system at a particular point in time. For example, a snapshot may be taken of a file system within a virtual machine by recording the file system structure and contents therein (e.g., the contents of each directory within the file system including any sub-directories, folders and files located therein). The snapshot may be then stored within a storage device as, for example, a hash value.

The term "interacting" (and all other tenses) should be interpreted as any action taken during processing of an object that involves, or is associated with, a particular data (e.g., represented as a file or folder within a file system). Examples of actions or events that may interact with a file or folder include, but are not limited or restricted to, opening the file or folder, copying the file or folder, renaming the file or folder, encrypting the filer or folder, password protecting the file or folder creating the file or folder, editing the file or folder, etc. In addition, the interaction may be direct (e.g., an action is performed on a file or folder) or indirect (e.g., an action is performed that results in an action being performed on a file or folder).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The invention may be utilized for detecting malware, specifically malware typically known as file altering malware through the use of dynamic analysis in virtual machine. As this invention is susceptible to embodiments of many different forms, it is intended that the present disclosure is to be considered as an example of the principles of the invention and not intended to limit the invention to the specific embodiments shown and described.

II. General Architectures of Threat Detection Platform

Referring to FIG. 1, an exemplary block diagram of a network 100 deploying a plurality of threat detection platforms (TDPs) $110_1$-$110_N$ (N>1, where N=3 for this embodiment) communicatively coupled to a management system 107 via a network 106 is shown. In general, the management system 107 is adapted to manage each TDP $110_1$-$110_3$. For instance, the management system 107 may be configured to provide content updates (e.g., updates to a lure configuration file, upload new rules/signatures or modified rules/signatures, delete rules/signatures, modify parameters that are utilized by the rules/signatures) to logic included within each TDP $110_1$-$110_3$. Additionally, content updates may be obtained as a result of information received through communications with the cloud computing services 105.

As shown in FIG. 1, a first TDP $110_1$ is an electronic device that is adapted to analyze information associated with incoming data (e.g., network traffic, input data over a communication network 102, input data from another type of transmission medium, etc.) from/to one or more endpoint devices 130. In this illustrative embodiment, the communication network 102 may include a public network such as the Internet, a private network (e.g., a local area network "LAN", wireless LAN, etc.), or a combination thereof.

According to the embodiment of FIG. 1, the first TDP $110_1$ may be communicatively coupled with one or more endpoint devices 104 (hereinafter referred to as "endpoint device(s)"). As shown, the first TDP $110_1$ may be communicatively coupled with the network 102 via the communication interface 111, which directs signaling on the communication network 102 to the scheduler 112 which in turn directs signaling to the static analysis engine 120, the dynamic analysis engine 130 and/or the storage device 113. The communication interface 111 is configured to receive at least a portion of network traffic propagating to/from the endpoint device(s) 104 and provide information associated with the received portion of the network traffic to the first TDP $110_1$. This information may include metadata and may be a portion of the received network traffic or a duplicated copy of the portion of the received network traffic. The metadata may be used, at least in part, to determine protocols, application types and other information that may be subsequently used by logic, such as the scheduler 112 for example, to configure one or more $VM_1$-$VM_K$ ($K \geq 1$) with selected software profiles. For instance, the metadata may be used to determine which software images (e.g., application(s)), if any, and/or operating systems to be fetched from the storage device 113 for configuring operability of the $VM_1$-$VM_K$.

Alternatively, although not shown, the communication interface 111 may be configured to receive files or other objects that are not provided over a network. For instance, as an example, the communication interface 111 may be a data capturing device that automatically (or on command), accessing data stored in a storage system or another type of interface, such as a port, for receiving objects manually provided via a suitable dedicated communication link or from storage media such as portable flash drives. Additionally, although not shown, the communication interface 111 may be integrated into an intermediary device in the communication path (e.g., a firewall, router, switch or other networked electronic device) or may be a standalone component, such as a commercially available network tap.

As further shown in FIG. 1, the first TDP $110_1$ comprises the communication interface 111, the static analysis engine 120, the dynamic analysis engine 130, the classification engine 140 and the reporting engine 150. Herein, the communication interface 111 receives an object from the network 102 and converts the object into a format, as needed or appropriate, on which analysis by the static analysis engine 120 may be conducted. This conversion may involve decompression of the object, decompilation of the object, extraction of specific data associated with the object, and/or emulation of the extracted data (like Javascript™).

The static analysis engine 120 may include one or more controllers (e.g., processing circuitry such as one or more processors) that feature, at least, heuristics logic 121 and signature matching logic 122. Further, the static analysis engine 120 may include one or more software modules that, when executed by the controller(s), analyzes characteristics associated with the object, which may be a portion of network traffic (or downloaded data) according to an embodiment of the disclosure. Such static analysis may include one or more checks being conducted on the object without its execution. Examples of the checks may include (i) heuristics, performed by the heuristic logic 121, which are based on rules or policies as applied to the object and may determine whether one or more portions of the object are associated with anomalous or suspicious characteristics associated with known malware (e.g., a particular URL associated with known malware, or a particular source or destination address etc.); and/or (ii) signature matching, performed by the signature matching logic 122, which may include determinative rule-based analysis such as comparisons with entries on a blacklist and/or a whitelist.

The static analysis engine 120 may route the object to the virtual run-time environment 131 within the dynamic analysis engine 130. The virtual run-time environment 131 may include a virtual machine monitor (VMM) 132, a monitoring logic 133, an analysis logic 134, storage device 136 and the $VM_1$-$VM_K$ ($K \geq 1$). The virtual run-time environment 131 provides for the processing of an object in one or more $VM_1$-$VM_K$ managed by the VMM 132.

The monitoring logic 133 monitors the processing of the one or more $VM_1$-$VM_K$. In particular, the monitoring logic 133 may monitor the launching process of the object within the $VM_K$ and all changes to the file system 205 while the object is processing. In one embodiment, the monitoring logic 133 may track the processing of each application by the process identification (PID) of the application. The monitoring logic 133 may also monitor any effects processing the object may have on the operating system and application(s) 206.

The analysis logic 134 is configured to analyze changes to the file system 205 monitored by the monitoring logic 133 during the processing of the object by $VM_K$. The analysis logic 134 may operate in conjunction with the monitoring logic 133, and compare one or more of (i) one or more changes to the file system 205 associated with a lure file, (ii) one or more changes to the file system 205 conducted within the $VM_K$ prior to the change associated with the lure file, and/or (iii) one or more changes to the file system 205 conducted within the $VM_K$ after the change associated with the lure file with one or more known file activity patterns. The comparison may determine the extent to which the actions associated with a lure file match one or more known file activity patterns. In one embodiment, actions associated with a lure file may include a singular change to the file system 205 associated with a lure file (e.g., copying of a lure file) and/or a series of changes to the file system 205 that are associated with the lure file (e.g., copying of a lure file, placement of the copy of the lure file, renaming of the copy of the lure file and encryption of the original lure file).

As shown, the monitoring logic 133 and the analysis logic 134 are included within the virtual run-time environment 131 wherein the monitoring logic 133 may monitor the processing and the analysis logic 134 may analyze the results of the processing within each of the $VM_1$-$VM_K$. In an alternative embodiment, although not shown, each of the $VM_1$-$VM_K$ may include a separate instance of the monitoring logic 133 and/or the analysis logic 134. In such an embodiment, for example, an instance of the monitoring logic 133 (e.g., monitoring logic $133_1$) may monitor the processing within the $VM_1$ and an instance of the analysis logic 134, (e.g., analysis logic $134_1$) may analyze the results of the processing within the $VW_1$. Furthermore, an instance of the monitoring logic 133 (e.g., the monitoring logic $133_K$) may further monitor the processing within the $VM_K$ and an instance of the analysis logic 134 (e.g., analysis logic $134_1$) may analyze the results of the processing within the $VM_K$.

The classification engine 140 may be configured to receive the static analysis results (e.g., results from a static analysis, metadata associated with the incoming network traffic, etc.) and/or the dynamic analysis results. According to one embodiment of the disclosure, the classification engine 140 comprises the prioritization logic 141 and the score determination logic 142. The prioritization logic 141 may be configured to apply weighting to results provided from dynamic analysis engine 130 and/or static analysis engine 120. The score determination logic 142 is configured to determine a probability (or level of confidence) that the document object is part of a malicious attack. More specifically, based on the dynamic analysis of the document object and one or more detected actions associated with one or more lure files, the score determination logic 142 generates a value that may be used, in part, to identify the likelihood that the object is part of a malicious attack, in particular, including file altering malware. Thereafter, the classification engine 140 may route classification results comprising the weighting and/or prioritization applied to the static analysis results and/or dynamic analysis results to the reporting engine 150. The classification results may include the classification of any malware detected into a family of malware, describe the malware and further include the metadata associated with any object(s) within which the malware were detected.

As shown in FIG. 1, the reporting engine 150 includes an interface rendering logic 151, an alert generation logic 152 and a classification storage 153. The reporting engine 150 is adapted to receive information from the classification engine 140 and generate alerts 154 that identify to a user of an endpoint device, network administrator or an expert network analyst that the object is associated with a malicious attack. The alerts may include various types of messages, which may include text messages and/or email messages, video or audio stream, or other types of information over a wired or wireless communication path. The reporting engine 150 features an optional user interface 155 (e.g., touch pad, keyed inputs, etc.) for customization as to the reporting configuration. The interface rendering logic 151 is configured to render and generate one or more graphical user interfaces (GUIs) to enable, for example, a network administrator to configure the virtual run-time environment 131 through one or more configuration files, as will be discussed in detail below. In addition, the reporting engine 150 may store the classification results in the classification storage 153 for future reference.

Although FIG. 1 illustrates the TDP $110_1$ as a dedicated network device and the discussion of FIG. 1 explains examples based on an object received by the communication interface 111, the TDP $110_1$ may be implemented on an endpoint device. In such an embodiment, prior to actual execution of the object, the TDP $110_1$ may launch the object in a sandboxed environment and conduct simulated human interaction and simulated device controls. Responsive to non-anomalous behaviors by the object, the endpoint is allowed to utilize the object. In addition, the TDP $110_1$ may be implemented in the cloud computing services 105, where the below described simulated human and device control interactions may be fully or partially conducted therein.

Figure 2:
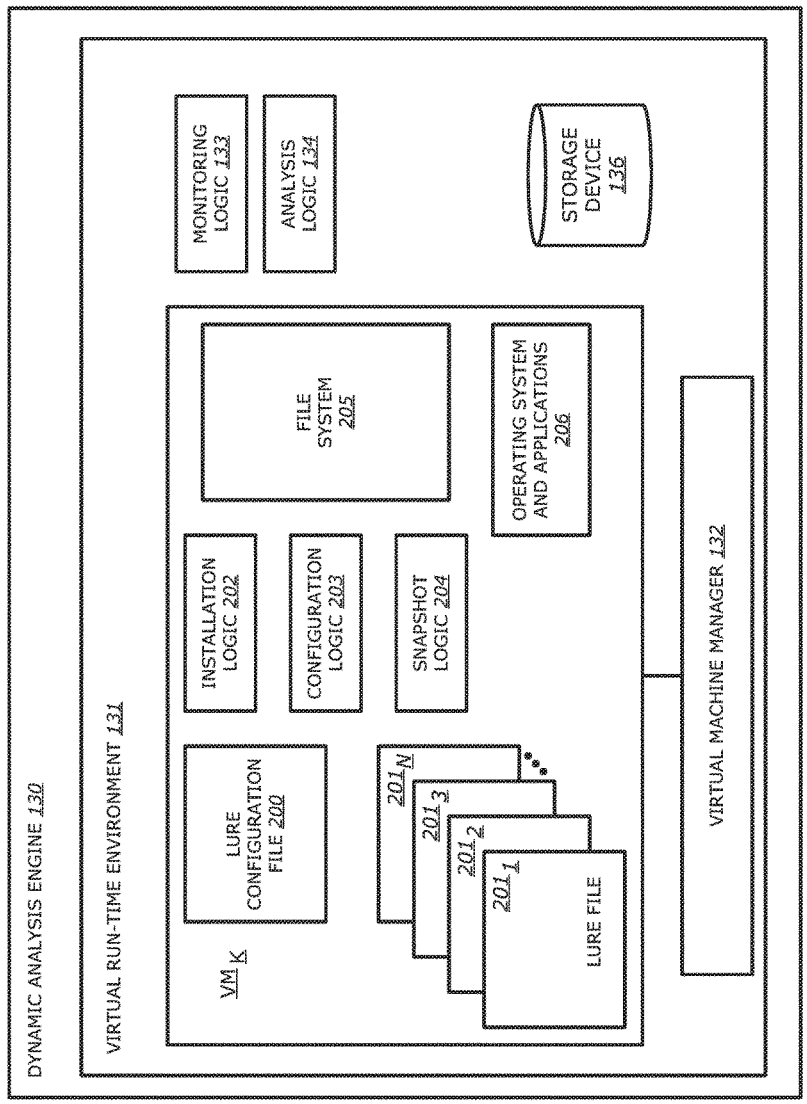
FIG. 2 is a block diagram of an exemplary dynamic analysis engine within the TDP of FIG. 1.

Referring now to FIG. 2, a block diagram of the dynamic analysis engine 130 within the TDP $110_1$ of FIG. 1 is shown. The dynamic analysis engine 130 includes a virtual run-time environment 131 that, as mentioned above, provides for the processing of an object through one or more $VM_1$-$VM_K$. As shown, the $VM_K$ may be provisioned with an installation logic 202, a configuration logic 203, a snapshot logic 204, a file system 205 and operating system (OS) and one or more applications 206. In addition, prior to beginning processing of the object, the $VM_K$ receives the object to analyze and a lure configuration file 200. In some embodiments, one or more lure files $201_1$-$201_N$ (N≥1). Alternatively, in one embodiment, when one or more lure files $201_1$-$201_N$ are not provided to the $VM_K$, the installation logic 202 may generate the one or more lure files $201_1$-$201_N$ according to information included in the lure configuration file 200.

The lure files $201_1$-$201_N$ may be files of one or more various types that may be placed within the file system 205 in order to entice, or "lure," malware, specifically file altering malware, to interact with one or more of the lure files $201_1$-$201_N$. Examples of file types include, but are not limited or restricted to, Microsoft® Office documents/files, PDF documents, text files, help files such as a Microsoft® Compiled HTML Help file (CHM), Extensible Markup Language (XML) files, etc.). The lure files $201_1$-$201_N$ are placed within the file system 205 such that typical, non-anomalous processing by the operating and applications 206 does not result in an interaction with the lure files $201_1$-$201_N$, or that an interaction is non-anomalous. For example, when the $VM_K$ is provisioned with Microsoft® Windows® XP operating system, one or more of the lure files $201_1$-$201_N$ may be placed among the Program Files on the "C: drive" (e.g., "C:\Program Files"). In such an example, it may be unlikely that the operating system and applications 206 would interact with the one or more lure files $201_1$-$201_N$. Therefore, if an interaction with the lure files $201_1$-$201_N$ occurs, the interaction may be indicative of the presence of file altering malware.

Alternatively, an interaction with the one or more lure files $201_1$-$201_N$ placed among the "Program Files" on the "C: drive" may be occur in a non-anomalous manner. For example, a non-malicious file scanner and/or a non-malicious cryptor may interact with one or more of the files and/or folders located among the "Program Files" on the "C: drive." Therefore, as will be discussed below, the dynamic processing of the one or more lure files $201_1$-$201_N$ includes an analysis of the changes to the file system 205 that are associated with the one or more lure files $201_1$-$201_N$ when determining whether the object is malicious (e.g., includes file altering malware).

The one or more lure files $201_1$-$201_N$ may include a specified file name, a pseudo-random file name or a random file name. The file name of each of the lure files $201_1$-$201_N$ is generated to entice malware such as file altering malware to interact with the one or more lure files $201_1$-$201_N$. Similarly, the lure files $201_1$-$201_N$ may include specified content, no content, pseudo-randomized content or randomized content. In addition, the lure files $201_1$-$201_N$ may be encrypted and/or include a password protection system prior to processing per the information included in the lure configuration file 200, wherein the malware may be enticed by files that include one or more security measures.

The lure configuration file 200 includes configuration information associated with the one or more lure files $201_1$-$201_N$ and the file system 205. In one embodiment wherein, the lure files $201_1$-$201_N$ are not received by the $VM_K$, the lure configuration file 200 includes information regarding attributes of the lure files $201_1$-$201_N$ such as, file-type, content-type, security measures to include with one or more of the lure files $201_1$-$201_N$ and placement location(s) for the one or more lure files $201_1$-$201_N$ within in the file system 205. The placement of the one or more lure files $201_1$-$201_N$ within the file system 205 will be described below in accordance with FIGS. 5A and 5B.

The file system 205 may be configured based on information included in the lure configuration file 200. For example, the lure configuration file 200 may include details of the file system of a particular endpoint device. In such an example, the file system 205 may be configured, prior to the processing of the object, to replicate the file system of the particular endpoint device thereby providing tailored detection of malware, specifically file altering malware.

The storage device 136 may store a snapshot of the file system 205, actions performed and events that occurred within the $VM_K$, and one or more known file activity patterns of changes to the file system 205 caused by malware such as file altering malware.

Figure 3:
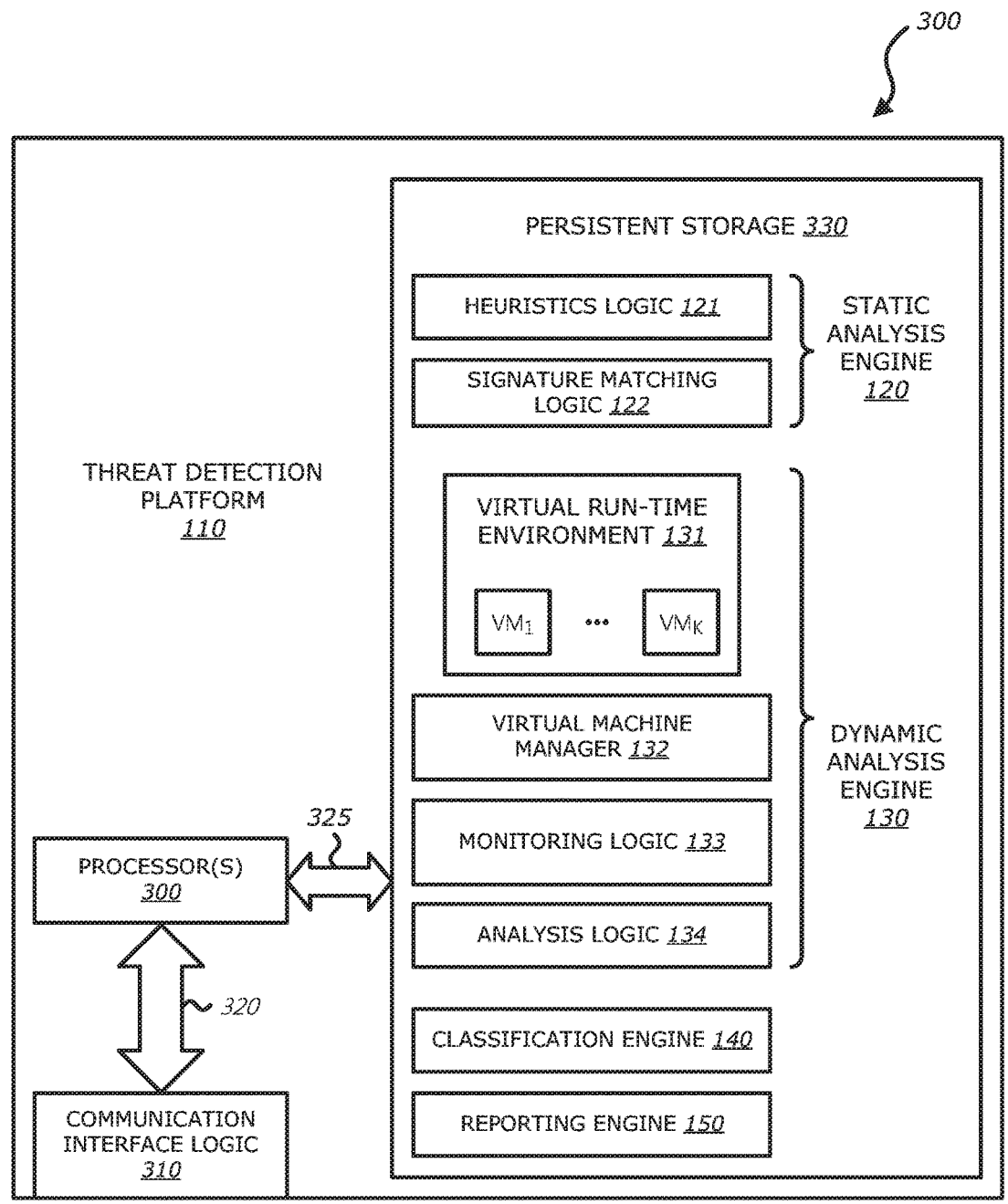
FIG. 3 is an exemplary block diagram of logic associated with the TDP of FIG. 1.

Referring to FIG. 3, an exemplary block diagram of logic associated with the $TDP\ 110_1$ of FIG. 1 is shown. The $TDP\ 110_1$ includes one or more processors 300 that are coupled to the communication interface logic 310 via a first transmission medium 320. Communication interface logic 310 enables communication with the $TDPs\ 110_2$-$110_3$ and management system 107 of FIG. 1. According to one embodiment of the disclosure, the communication interface logic 310 may be implemented as a physical interface including one or more ports for wired connectors. Additionally, or in the alternative, communication interface logic 310 may be implemented with one or more radio units for supporting wireless communications with other network devices.

The one or more processors 300 are further coupled to the persistent storage 330 via the transmission medium 325. According to one embodiment of the disclosure, the persistent storage 330 may include (i) the static analysis engine 120 including the heuristics logic 121 and the signature matching logic 122; (ii) the virtual run-time environment including the $VM_1$-$VM_K$, the virtual machine manager (VMM) 132, the monitoring logic 133 and the analysis logic 134; (iii) the classification engine 140; and (iv) the reporting engine 150. Of course, when implemented as hardware (such as circuitry and/or programmable logic arrays), one or more of these logic units could be implemented separately from each other. In addition, one or more of these logic units may be implemented in hardware while one or more logic units may be implemented as software.

III. Operational Flow of the Threat Detection Platform

Figure 4:
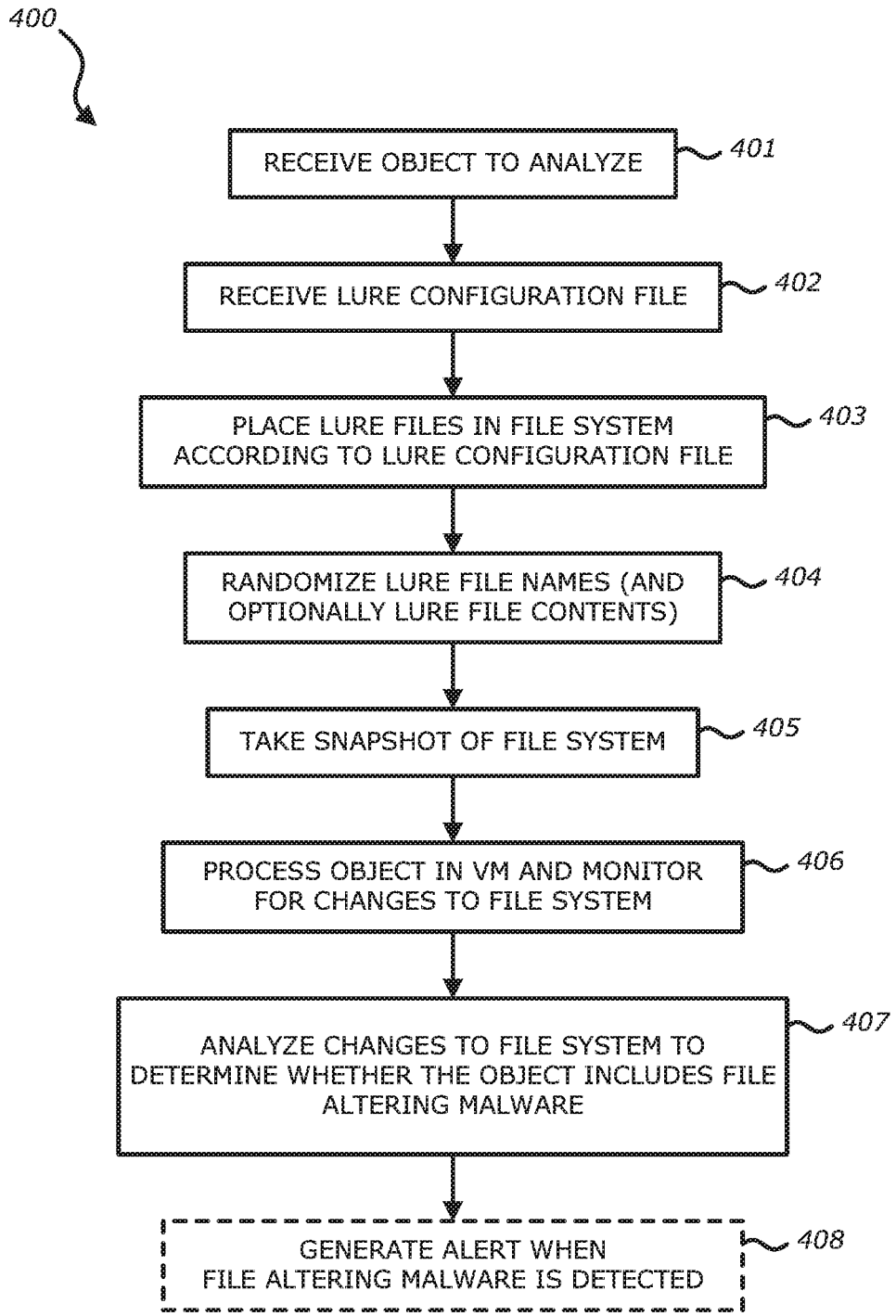
FIG. 4 is a flowchart illustrating an exemplary method for analyzing an object with the TDP of FIG. 1.

Referring to FIG. 4, a flowchart illustrating an exemplary method for analyzing an object with the $TDP\ 110_1$ of FIG. 1 is shown. Each block illustrated in FIG. 4 represents an operation performed in the method 400 of detecting malware based on the use of $TDP\ 110_1$ of FIG. 1 wherein the object and a lure configuration file 200 are received by the $TDP\ 110_1$ for processing. At block 401, the $TDP\ 110_1$ receives the object to analyze and at block 402, the $TDP\ 110_1$ receives the lure configuration file 200. At block 403, one or more lure files $201_1$-$201_N$ are placed in the file system 205 of the $VM_K$ within the $TDP\ 110_1$ according to the contents of the lure configuration 200.

At block 404, the file names of the lure files $201_1$-$201_N$ are randomized (e.g., undergo random or pseudo-random operations) according to the lure configuration file 200. In addition, the information included in the lure configuration file 200 may also specify that the contents of the lure files $201_1$-$201_N$ are to be randomized or pseudo-randomized. At block 405, a snapshot of the file system 205 is taken to preserve the state of the file system 205 prior to processing. The snapshot is to be used in the analysis of changes to the file system 205 that are associated with one or more of the lure files $201_1$-$201_N$ during, or subsequent, to the processing of the object.

In one embodiment, the randomization of the lure file names is performed by the configuration logic 203 generating a hash value (e.g., MD5 hash) based on a time and date included in the lure configuration file 200. The hash value is provided to a random number generator function included within the configuration logic 203. The output of the random number generator may then be used to pseudo-randomize the names of the lure files $201_1$-$201_N$. For example, if the output of the random number generator is "PO730," the configuration logic 203 may pseudo-randomize the lure file name "Sensitive_Corporate_Financial_Matters.docx" to be "Sensitive_Corporate_Financial_MattersPO730.docx." In one embodiment in which the lure file names are pseudo-randomized instead of completely randomized, the processing of the object in the $VM_K$ is done to entice the file altering malware to interact with the lure file based on, at least in part, the lure file name. As an additional note, the time and date information that is included in the configuration file 200 may not be the same for each of $VM_1$-$VM_K$. When each of $VM_1$-$VM_K$ receives a different time and date, the random number generator of each of $VM_1$-$VM_K$ will not generate the same random number because the hash value provided as an input to the random number generator of each of $VM_1$-$VM_K$ will not be the same when the date and time are not the same for each of $VM_1$-$VM_K$.

At block 406, the received object is processed in the $VM_K$ and the processing is monitored for changes to the file system 205, specifically changes associated with one or more of the lure files $201_1$-$201_N$. In particular, the object is "launched" using an application and actions typical of processing using the application on an endpoint device are performed. For example, the object may be a binary object such as an application (.APK), a batch file (.BAT), a command script (.CMD), an executable (.EXE, and/or .DLL) or the like. The monitoring logic 133 monitors any effects on the run-time environment within the $VM_K$ the processing of the object may have (e.g., changes to the file system 205 that are associated with one or more of the lure files $201_1$-$201_N$).

At block 407, the changes to the file system 205 are analyzed by the analysis logic 134 to determine whether the object includes malware such as file altering malware. In one embodiment, the analysis logic 134 may retrieve one or more known file activity patterns of one or more changes to the file system 205 caused by file altering malware (hereinafter referred to as "known file activity patterns") and compare the one or more known file activity patterns to the actions monitored by the monitoring logic 133. The analysis logic 134 may determine whether the changes to the file system 205 monitored in the $VM_K$ is involved or associated with one or more of the lure files $201_1$-$201_N$ match at least a portion of the one or more of the known file activity patterns.

The analysis of the processing of the object and the effects on the file system may be performed in a plurality of methods. In a first embodiment, the processing of the object in the $VM_K$ and the analysis by the analysis logic 134 may execute concurrently (wherein, the term "concurrently" should be interrupted as "at least partially overlapping at the same time"). For example, upon detection of an action interacting with one or more of the lure files $201_1$-$201_N$, the analysis logic 134 may begin to compare actions prior to the interaction with the one or more of the lure files $201_1$-$201_N$, the actual interaction with the one or more of the lure files $201_1$-$201_N$, actions subsequent to the interaction with the one or more of the lure files $201_1$-$201_N$ and any effects on the file system 205. In one embodiment, the one or more lure files $201_1$-$201_N$ may include hooks that notify the monitoring logic 133 and the analysis logic 134 of any actions taken involving the one or more of the lure files $201_1$-$201_N$.

In a second embodiment, the processing of the object may be completed (e.g., a predetermined number of actions were performed within the $VM_K$, or the processing occurred for a predetermined amount of time) prior to analysis by the analysis logic 134. In such an embodiment, the snapshot of the file system 205 and the changes to the file system 205 monitored by the monitoring logic 133 may be stored in the storage device 136. Upon completion of the processing of the object, the analysis logic 134 may retrieve the known file activity patterns, the snapshot of the file system 205 and the changes to the file system 205 by the monitoring logic 133 and compare the state of the file system 205 after processing the object with the state of the file system 205 captured by the snapshot (e.g., analyze the changes made to the file system 205).

Additionally, as discussed above, the dynamic analysis results are provided to the classification engine wherein the dynamic analysis results may be combined with the static analysis results. Furthermore, when the object is determined to include malware such as file altering malware, the classification engine 140 may classify the malware by malware family based on experiential knowledge. For example, based on details of malware families stored within the storage device 113, the classification engine 140 may determine a threat level of the object based on the static analysis results and the dynamic results and determine the malware family of the file altering malware, when applicable.

Still referring to FIG. 4, at block 408, when an object is determined to include file altering malware, an optional alert may be generated by the reporting engine 150 to notify one or more of a user of an endpoint device, a network administrator and/or an expert network analyst of the file altering malware included in the object and, if applicable, the family of malware to which the file altering malware belongs. Additionally, the results of the processing and classification may be stored within the classification storage 153 for future reference.

The method 400 illustrated in FIG. 4 may be divided into three phases: (A) an installation phase; (B) a configuration phase; and (C) a processing and analysis phase. Each of the phases will be discussed in detail below, in accordance with the discussion of FIGS. 5A-5C, 6A and 6B.

A. Installation Phase

Figure 5A:
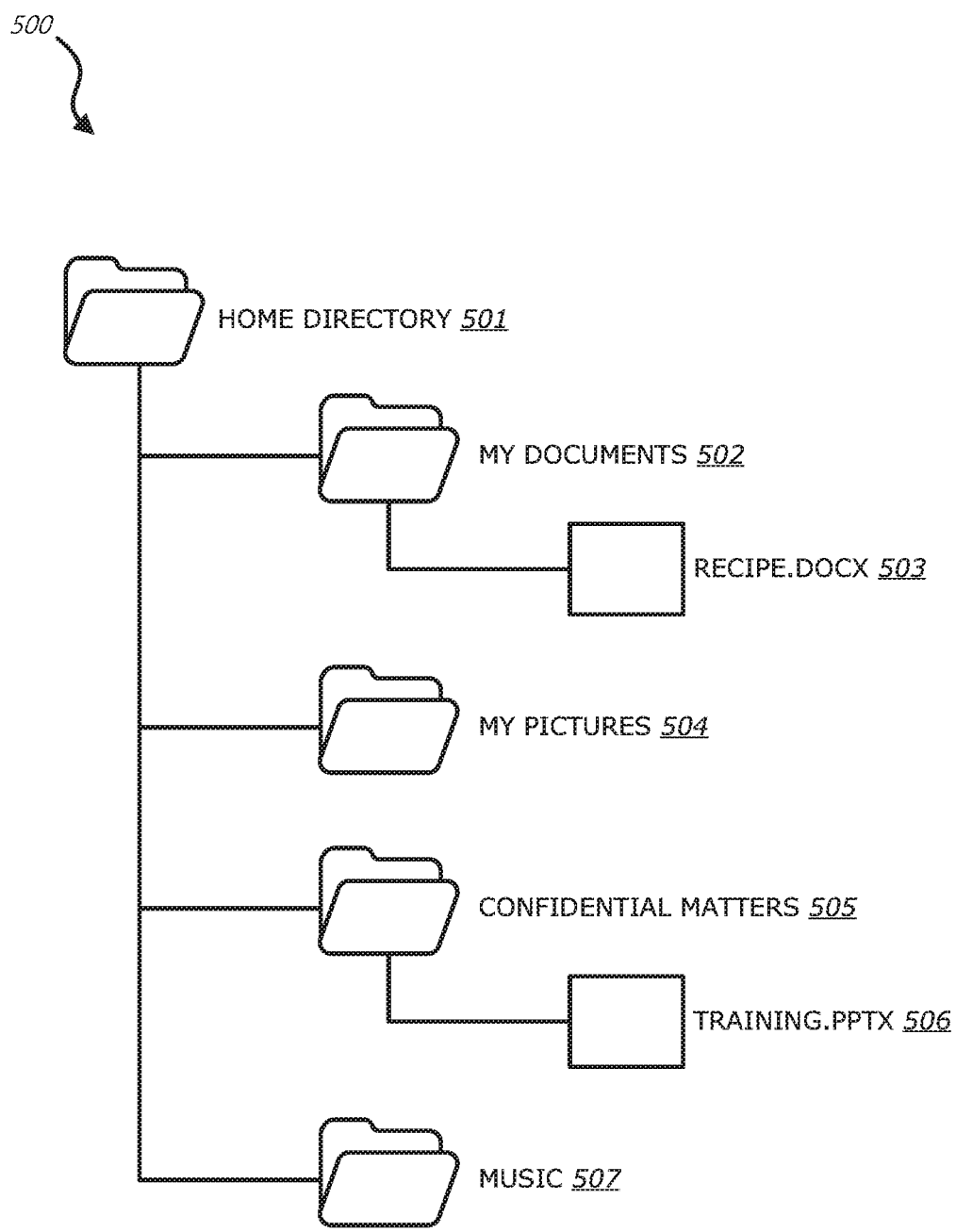
FIG. 5A is an illustration of an exemplary file system prior to placement of one or more lure files.

Referring now to FIG. 5A, an illustration of an exemplary file system prior to placement of one or more lure files is shown. Herein, the example file system 500 includes a "Home Directory" folder 501 that includes a "My Documents" folder 502, a "My Pictures" folder 504, a "Confidential Matters" folder 505 and a "Music" folder 507. As is shown, the "My Documents" folder 502 includes a "Recipe.docx" file 503 and the "Confidential Matters" folder 505 includes a "Training.pptx" file 506.

Referring back to FIG. 2, during the installation phase, the lure configuration file 200 is received by the $VM_K$. Assuming the lure files $201_1$-$201_N$ are not received by the $VM_K$ and need to be generated, the installation logic 202 contains logic to analyze the lure configuration file 200 and determine (i) the number of lure files that are to be generated, (ii) the type of each lure file, (iii) the characteristics of each (e.g., contents, security measures, pseudo-randomization of file name, etc.), and (iv) the location in the file system 205 of each of the lure files to be generated. Further, the installation logic 202 may generate the lure files $201_1$-$201_N$ and place the lure files $201_1$-$201_N$ in the appropriate locations within the file system 205.

Figure 5B:
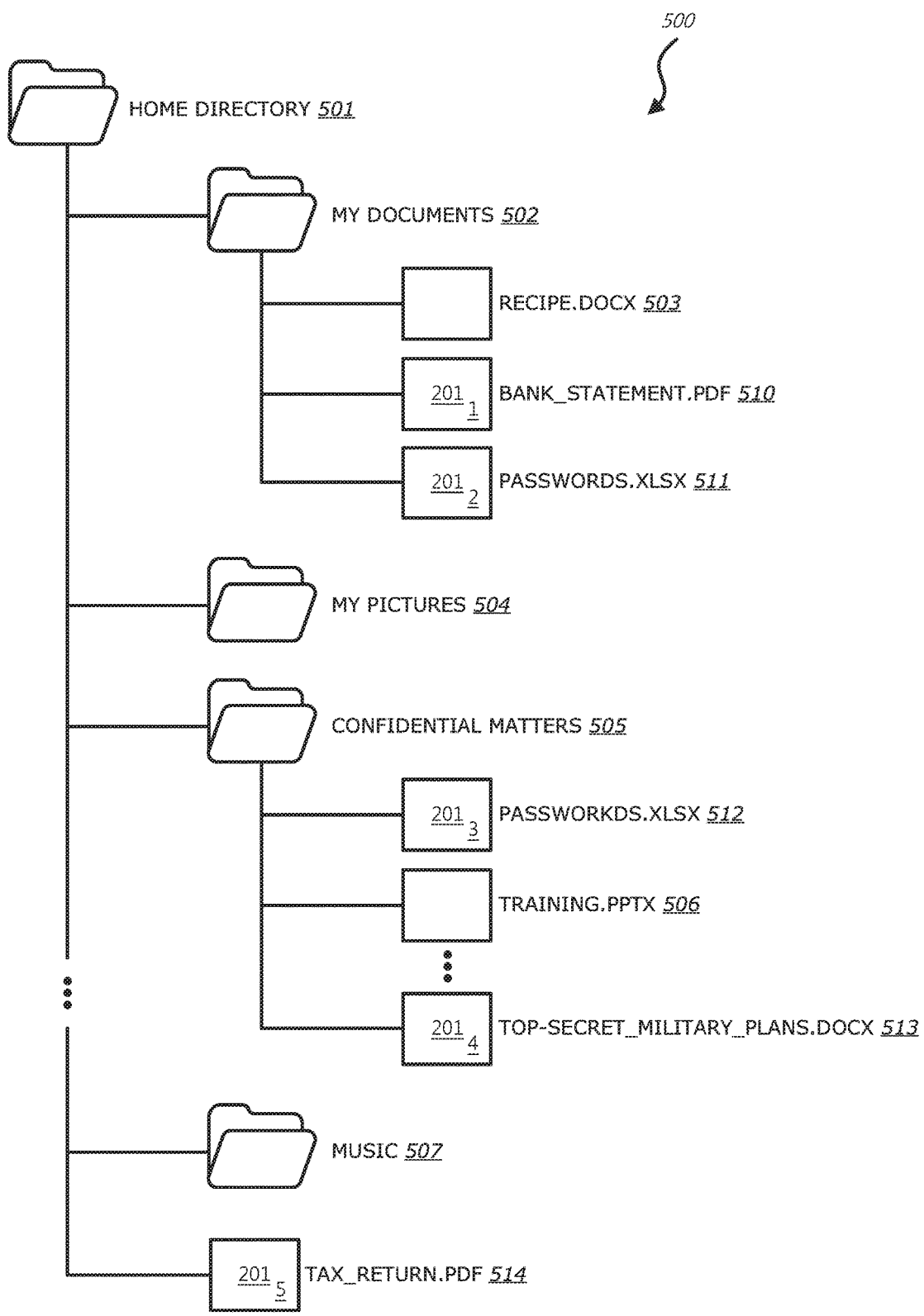
FIG. 5B is an illustration of the exemplary file system of FIG. 5A following placement of a plurality of lure files.

Referring now to FIG. 5B, an illustration of the exemplary file system of FIG. 5A following placement of the lure files $201_1$-$201_N$ (N=5 for this embodiment) is illustrated. Herein, the lure file $201_1$ is a PDF document titled "Bank_Statement.PDF," the lure file $201_2$ is a Microsoft® Excel® file titled "Passwords.XLSX," the lure file $201_3$ is a Microsoft® Excel® file titled "Passwords.XLSX," the lure file $201_4$ is a Microsoft® Word® file titled "Top-Secret_Military_Plans.DOCX," and the lure file $201_5$ is a PDF document titled "Tax_Return.PDF." Although in the embodiment disclosed herein, the lure files $201_{1-5}$ are illustrated as "files," a "lure file" may also be a folder itself that optionally includes one or more lure files.

B. Configuration Phase

During the configuration phase, the $VM_K$ may receive the object to analyze. Referring back to FIG. 2, once the lure files $201_1$-$201_N$ are present within the $VM_K$ (whether they were received or generated therein), and placed in the appropriate locations within the file system 205, the file names may be randomized, or pseudo-randomized (in addition, the content may be randomized, or pseudo-randomized as well). By randomizing, or pseudo-randomizing, the file names, malware writers will be unable to merely identify a file by name that is routinely part of the file system that detects the malware. For example, when a malware writer attempts to determine that a detection system is being used to detect malware, the malware writer may attempt to identify a particular file name that is always present and thereby develop malware that avoids the particular file name. Therefore, by randomizing, or pseudo-randomizing, the file names of one or more of the lure files $201_1$-$201_N$, detection by the malware that it is being processed in a VM becomes more difficult as a singular file name will not continually reoccur.

Figure 5C:
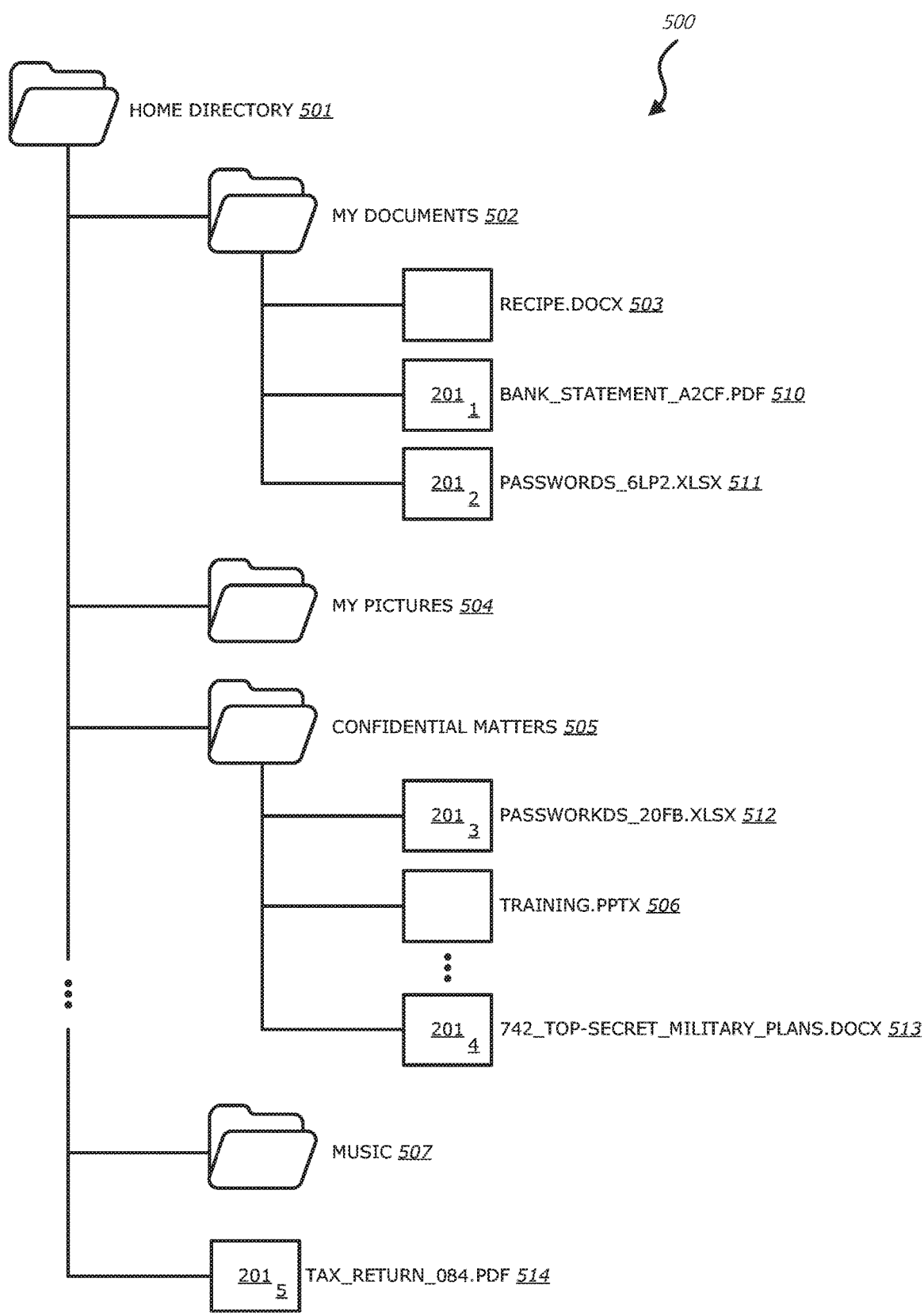
FIG. 5C is an illustration of the exemplary file system of FIG. 5B following pseudo-randomization of the names of the plurality of lure files.

Referring to FIG. 5C, an illustration of the exemplary file system of FIG. 5B following the pseudo-randomization of the names of the lure files $201_1$-$201_5$ is shown. Herein, the lure files $201_1$-$201_5$ of the example file system 500 of FIG. 5B that were added to the file system 205 during the installation phase are seen to be configured with pseudo-randomized file names. Herein, the lure file $201_1$ is titled, "Bank_Statement_A2CF.PDF"; the lure file $201_2$ is titled, "Passwords_6LP2.XLSX"; the lure file $201_3$ is titled, "Passwords_20FB.XLSX"; the lure file $201_4$ is titled, "742_Top-Secret_Military_Plans.DOCX"; and the lure file $201_5$ is titled, "Tax_Return_084. PDF."

C. Processing and Analysis Phase

Figure 6A:
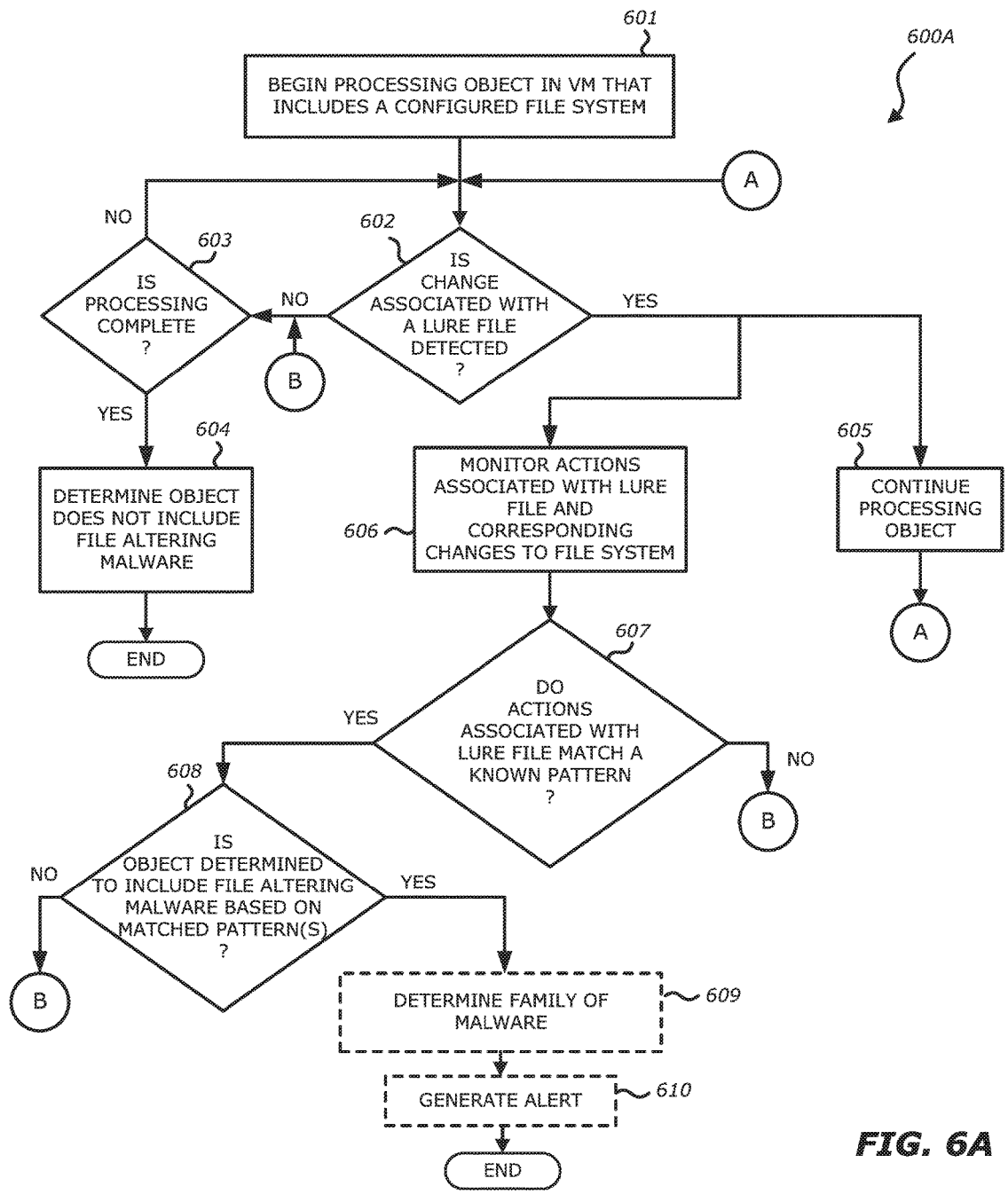
FIG. 6A is a flowchart illustrating a first exemplary method for analyzing a file system after processing an object with the TDP of FIG. 1.

Referring now to FIG. 6A, a flowchart illustrating a first exemplary method for analyzing a file system after processing an object with the TDP $110_1$ of FIG. 1 is shown. Each block illustrated in FIG. 6A represents an operation performed in the method 600A of processing the object based on the use of TDP $110_1$ wherein the processing of the object and the analysis of one or more changes to the file system 205 associated with one or more lure files are done concurrently. At block 601, the TDP $110_1$ begins processing the object in the $VM_K$. At block 602, a determination is made as to whether a change to the file system 205 associated with a lure file is detected. When a change to the file system 205 is detected but the change is not associated with one or more of the lure files $201_1$-$201_N$ (no at block 602), a determination is made as to whether the processing is complete (block 603). When the processing is complete (e.g., and no change associated with a lure file was detected) (yes at block 603), a determination is made that the object does not include file altering malware (block 604).

When a change to the file system 205 associated with a lure file is detected (yes at block 602), the processing performs two concurrent steps: (1) at block 605, the processing of the object continues and the monitoring logic 133 continues to monitor for additional changes to the file system 205 associated with a lure file, and (2) the detected change associated with the lure file is monitored (block 606). Referring to (1), the processing of the object continues at block 605 and the method 600A subsequently returns to block 602 to determine whether a change to the file system 205 associated with a lure file is detected. Referring to (2), the detected change associated with the lure file is monitored (block 606) and, subsequently, a determination is made as to whether the detected change(s) associated with the one or more lure files matches one or more known file activity patterns (block 607).

When the one or more change to the file system 205 associated with the one or more lure files do not match one or more known file activity patterns (no at block 607), a determination is made as to whether the processing is complete (block 603) and, if so, it is determined that the object does not include file altering malware (block 604), or, if not (no at block 603), the processing continues at block 602.

Additionally, when one or more changes to the file system 205 that are associated with a lure file are not determined to match one or more known file activity patterns, the one or more changes to the file system 205 may be provided to, for example, an expert network analyst for further analysis. In such an instance, a new pattern may be developed if it is determined by the network analyst that the one or more changes to the file system 205 that did not match any known file activity patterns is a result of file altering malware. Alternatively, the change to the file system 205 that is associated with a lure file but does not match a known pattern may be the result of a non-malicious file scanner, a non-malicious encryption application and/or another non-malicious application.

When the one or more change to the file system 205 associated with the one or more lure files matches a known pattern (yes at block 607), a determination is made as to whether the object includes file altering malware based on the matched known pattern (block 608). At block 608, the analysis logic 134, operating in conjunction with the monitoring logic 133, compares one or more of (i) change to the file system 205 associated with a lure file, (ii) one or more changes to the file system 205 conducted within the $VM_K$ prior to the change associated with the lure file, and/or (iii) one or more changes to the file system 205 conducted within the $VM_K$ after the change associated with the lure file with the known pattern. The comparison may determine the extent to which the actions associated with a lure file match the known pattern. The comparison of the known pattern with the information associated with the detected change to the file system 205 may be included in the dynamic analysis results provided to the classification engine 140. In one embodiment, the dynamic analysis results may include, at least, one or more of: the extent to which one or more detected actions associated with a lure file match one or more known file activity patterns; information associated with the detected actions associated with a lure file; and/or metadata associated with the each detected action.

Subsequently, the score determination logic 142 may determine (i) a score for each detected change to the file system 205 and (ii) whether one or more of the scores exceeds a predetermined threshold wherein the predetermined threshold represents a threat level (e.g., "suspicious," "malicious," or "benign"). Alternatively, a score may be a certain threat level (e.g., "suspicious," "malicious," or "benign," being an indication of the likelihood of including file altering malware) or a value that signifies a likelihood of including file altering malware that may be compared to one or more predefined thresholds to determine the likelihood of including file altering malware.

Optionally, when the object is determined to include file altering malware, the family of malware to which the object belongs may be determined (block 609). Herein, the classification logic 140 may compare the one or more changes to the file system 205 associated with the one or more lure files with information pertaining to malware families stored in, for example, the storage device 113. Finally, and also optionally, an alert may be generated to notify one or more of a user of an endpoint device, a network administrator and/or an expert network analyst of the detection of the inclusion of file altering malware within the object (block 610).

Figure 6B:
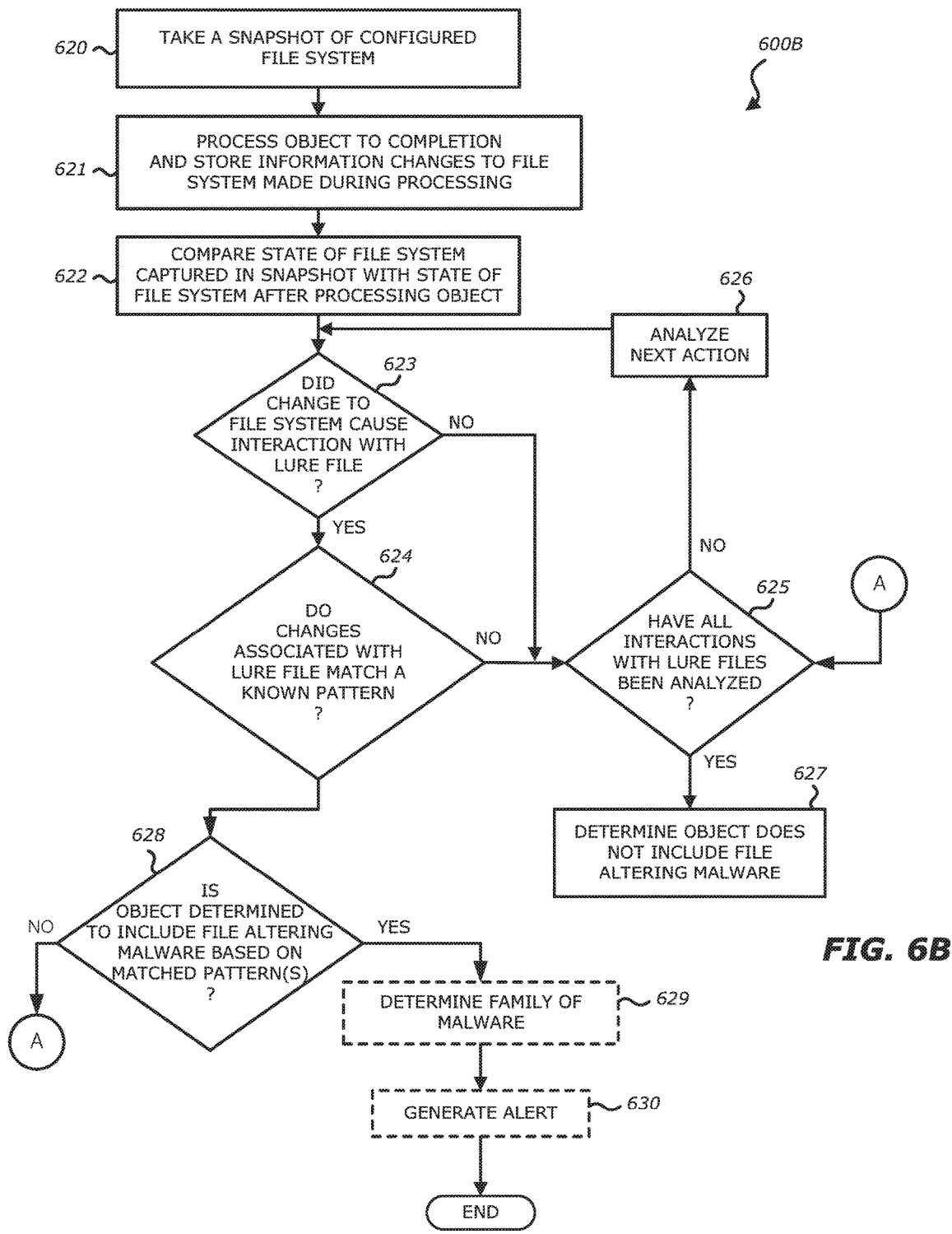
FIG. 6B is a flowchart illustrating a second exemplary method for analyzing a file system after processing an object with the TDP of FIG. 1.

Referring now to FIG. 6B, a flowchart illustrating a second exemplary method for analyzing a file system after processing an object with the configuration of the $TDP\ 110_1$ of FIG. 1 is shown. Each block illustrated in FIG. 6B represents an operation performed in the method 600B of processing an object based on the use of the $TDP\ 110_1$ of FIG. 1 wherein the processing of the object is completed prior to the analysis of one or more changes to the file system 205 associated with one or more lure files. At block 620, a snapshot is taken of a configured file system that will be used to process the object, as discussed above. At block 621, the object is processed in the $VM_K$ until completion and changes to the file system 205 conducted during the processing (e.g., as monitored by the monitoring logic 133) are stored in a storage medium. At block 622, the state of the file system captured in the snapshot is compared with the state of the file system after processing the object (e.g., the changes made to the file system 205 during processing are analyzed to determine whether an interaction with one or more lure files occurred).

At block 623, a determination is made as to whether a change to the file system 205 caused an interaction with a lure file. When the action did not interact with a lure file (no at block 623), a determination is made as to whether all changes to the file system 205 that were detected and stored have been analyzed (block 625).

When all changes have not been analyzed (no at block 625), the next change detected during processing is analyzed (block 626). When all changes have been analyzed (i.e., and none of the analyses resulted in a determination that the object includes file altering malware) (yes at block 625), it is determined the object does not include file altering malware (block 627).

When a change involved an interaction with a lure file (yes at block 623), a determination is made as to whether the detected change(s) associated with the lure file match one or more known file activity patterns (block 624). When the change(s) associated with the lure file do not match one or more known file activity patterns (no at block 624), a determination is made as to whether all actions monitored and stored have been analyzed (at block 625), as discussed above.

Additionally, when one or more changes to the file system 205 that are associated with a lure file are not determined to match one or more known file activity patterns, the one or more changes to the file system 205 may be provided to, for example, an expert network analyst for further analysis. In such an instance, a new pattern may be developed if it is determined by the network analyst that the one or more changes to the file system 205 that did not match any known file activity patterns is a result of file altering malware. Alternatively, the change to the file system 205 that is associated with a lure file but does not match a known pattern may be the result of a non-malicious file scanner, a non-malicious cryptor and/or another non-malicious application.

When the one or more changes to the file system 205 associated with the one or more lure files match one or more known file activity patterns (yes at block 624), a determination is made as to whether the object includes file altering malware based on the match with one or more known file activity patterns (block 628). Subsequently, the dynamic analysis results may be provided to the classification engine 140 such that a determination as to whether the object includes file altering malware based on, at least, the dynamic analysis results can be made. For example, a score or threat level indicating the likelihood of the inclusion of file altering malware within the object may be determined by the score determination logic 142.

Optionally, a determination of the malware family to which the malware belongs may be made (block 629). Additionally, and also optionally, an alert may be generated detailing the detection of the file altering malware (block 630).

IV. Graphical User Interface Configuration

Figure 7:
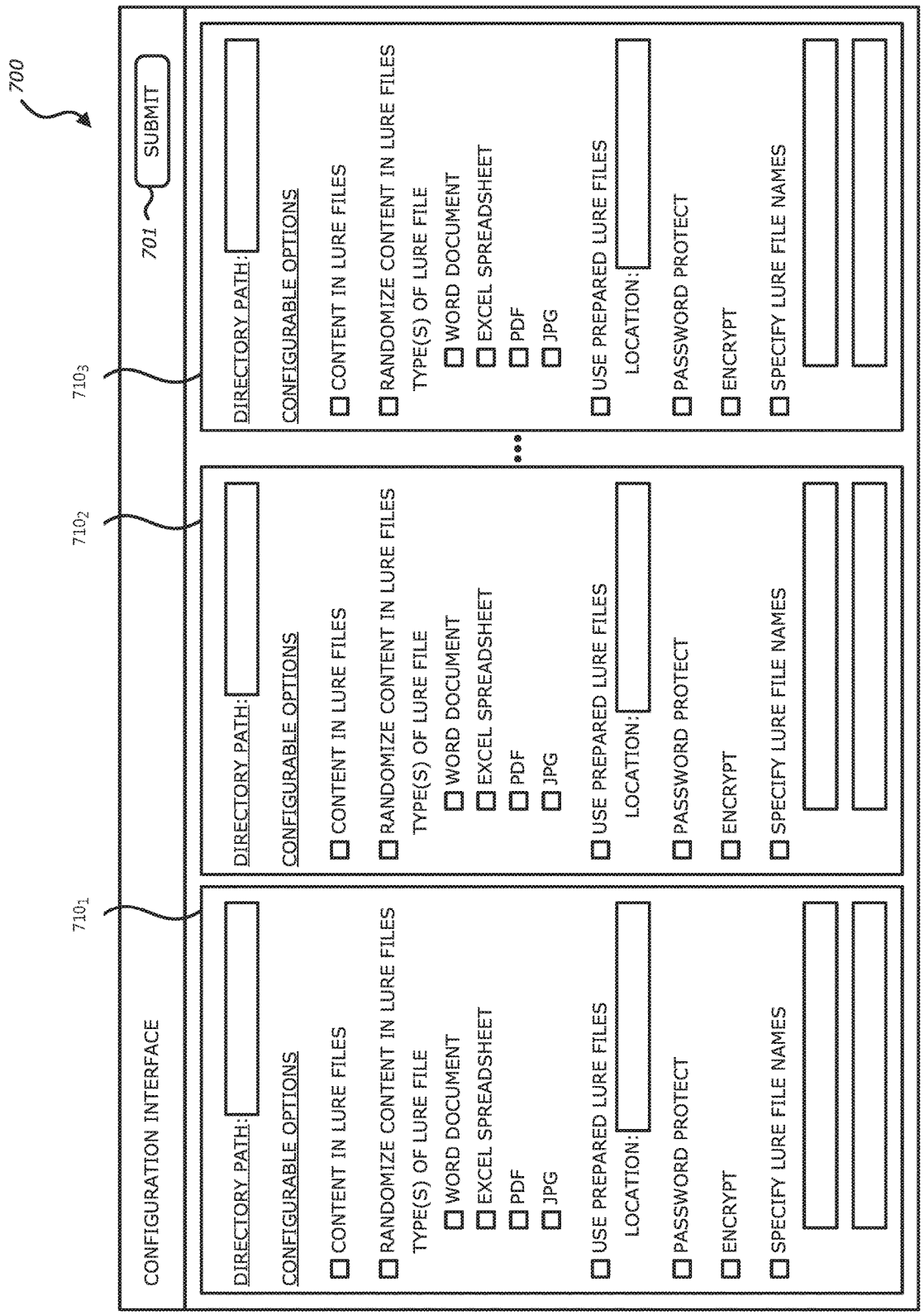
FIG. 7 is an illustration of exemplary graphical user interface associated with the TDP of FIG. 1.

Referring now to FIG. 7, an illustration of an exemplary graphical user interface associated with the configuration of the TDP 110$_1$ of FIG. 1 is shown. Herein, rendered by the interface rendering logic 151, the display screen 700 features a plurality of display areas 710$_1$-710$_P$ (P≥1, where P=3 for this embodiment) that illustrates information directed to configuring the file system 205 and the lure files 201$_1$-201$_N$ prior to the dynamic analysis of one or more objects within one or more of VM$_1$-VM$_K$.

The display screen 700 may be rendered in order to enable, for example, a network administrator to configure one or more of the VM$_1$-VM$_K$. A network administrator may configure one or more of the VM$_1$-VM$_K$ according to the specifications of the file system of the endpoint device(s), or the file system of an enterprise.

According to one embodiment of the disclosure, a first display area 710$_1$ provides an option to include the directory path of the location to which the selected options of the display area 710$_1$ are to apply. Assuming the TDP 110$_1$ is to generate the lure files, the display area 710$_1$ may provide a plurality of configurable options such as (i) an option to place content in the lure files, (ii) an option to randomize the content in the lure files, and (iii) the file type of the lure files. In addition, options to provide security measures may be provided (e.g., password protection and/or encryption). The display area 710$_1$ may provide an option to use prepared lure files and one or more text boxes for the location of the one or more lure files 201$_1$-201$_N$. Finally, the display area 710$_1$ may provide an option to specify one or more lure file names. Additional display areas 710$_2$-710$_P$ may provide one or more of the same options or provide alternate options.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A system comprising:
   one or more processors; and
   a storage module communicatively coupled to the one or more processors, the storage module comprising logic that, upon execution by the one or more processors, performs operations comprising:
      receiving configuration information that identifies at least one or more locations of a system operating within a virtual machine for placement of lure data in the system, the lure data being configured to entice interaction of the lure data by malware associated with an object under analysis,
      placing the lure data within the system according to the configuration information,
      subsequent to placing the lure data within the system, selectively modifying information associated with the lure data,
      processing the object within the virtual machine, and
      determining whether the object exhibits one or more behaviors that alter the lure data or a portion of the system based on a comparison of one or more actions performed while processing the object that are associated with the lure data and one more patterns that represent one or more changes to the system associated with the lure data caused by known malware.

2. The system of claim 1, wherein the placing of the lure data within the system comprises generating one or more lure files according to the configuration information and placing a lure file of the one or more lure files into the one or more locations of a file system being the system configured at least for data storage.

3. The system of claim 2, wherein the selectively modifying the information associated with the lure data comprises modifying a name of the lure file.

4. The system of claim 2, wherein the selectively modifying the information associated with the lure data comprises modifying content of (i) a directory within the file system, (ii) the content includes a sub-directory, (iii) a folder, or (iv) a file located within the directory.

5. The system of claim 2, wherein the logic further performs the operations including analyzing the configuration information including a lure configuration file and determining (i) a number of lure files to be generated, (ii) a type of each lure file of the one or more lure files, (iii) characteristics of each lure file of the one or more lure files, and (iv) a location in the file system for each of the one or more lure files.

6. The system of claim 2 further comprising:
   prior to processing the object received from a network, capturing a snapshot of a state of the file system including the lure data having the selectively modified information.

7. The system of claim 6, wherein determining whether the object exhibits file altering behavior includes a comparison of the state of the file system captured in the snapshot and a state of the file system after beginning processing the object.

8. The system of claim 1, wherein the configuration information is part of a lure configuration file that includes configuration information associated with one or more lure files being part of the lure data and information associated with placement of the one or more lure files in the system operating as a file system.

9. The system of claim 1, wherein the selectively modifying of the information associated with the lure data comprises adding one or more characters to a name assigned to the lure data.

10. The system of claim 9, wherein the name of the lure data is modified into a pseudo-random name.

11. The system of claim 1, wherein the logic, prior to placing the lure data within the system, performs an operation of configuring the system to replicate a file system of a particular endpoint device.

12. The system of claim 1, wherein the system corresponds to one of a disk file systems, an optical disk file system, a flash file system, or a database file system.

13. The system of claim 1, wherein the lure data includes a lure file with one or more security measures being utilized to appear that contents of the lure file are being protected, the one or more security measures include encryption or password protection.

14. The system of claim 1, wherein the configuration information further includes at least one attribute of the lure data.

15. The system of claim 14, wherein the selectively modifying the information associated with the lure data comprises modifying an attribute of the at least one attribute of the lure data.

16. The system of claim 14, wherein the lure data is a lure file and the at least one attribute includes a name of the lure file.

17. A non-transitory computer readable medium that is executed by one or more hardware processors, the medium comprising:
   a virtual machine installed with a file system, a configuration file, and one or more lure files;
   a first software module that, upon execution by the one or more hardware processors, selectively modifies information associated with a lure file of the one or more lure files;
   a second software module that, upon execution by the one or more hardware processors, processes an object received from a network within the virtual machine; and
   a third software module that, upon execution by the one or more hardware processors, determines the object includes file altering malware when one or more actions performed while processing the object that are associated with the lure file match a known pattern.

18. The non-transitory computer readable medium of claim 17, wherein the first software module to selectively modify the information associated with the lure file by at least modifying a name of the lure file.

19. The non-transitory computer readable medium of claim 17, wherein the first software module to selectively modify the information associated with the lure file by at least modifying content of a directory within the file system, the content includes one of a sub-directory, a folder or a file located within the directory.

20. The non-transitory computer readable medium of claim 17, wherein the configuration file being used by the one or more hardware processors to determine (i) a number of lure files to be generated, and (ii) a location in the file system for each of the one or more lure files.

21. The non-transitory computer readable medium of claim 20, wherein the configuration file being further used by the one or more hardware processors to determine (iii) a type of each lure file of the one or more lure files, and (iv) characteristics of each lure file of the one or more lure files.

22. The non-transitory computer readable medium of claim 17 further comprising:
   a snapshot of a state of the file system including the lure file having the selectively modified information.

23. The non-transitory computer readable medium of claim 22, wherein the third software module, upon execution by the one or more hardware processors, determines the object includes file altering malware upon a comparison of the state of the file system captured in the snapshot and a state of the file system after beginning processing of the object.

24. A computerized method, comprising:
   receiving configuration information that identifies least one or more locations of a system configured at least for data storage that is operating within a virtual machine for placement of the lure data into the system, the lure data being configured to entice interaction of the lure data by malware associated with an object under analysis;
   placing the lure data within the system according to the configuration information;
   subsequent to placing the lure data within the system, selectively modifying information associated with the lure data;
   processing the object within the virtual machine; and
   determining whether the object exhibits one or more behaviors that alter (i) the lure data or (ii) a portion of the system based on a comparison of one or more actions performed while processing the object that are associated with the lure data and one more patterns that represent one or more system changes caused by known malware.

25. The computerized method of claim 24, wherein the placing of the lure data within the system comprises generating one or more lure files according to the configuration information and placing a lure file of the one or more lure files into the one or more locations of the system operating as a file system.

26. The computerized method of claim 25, wherein the selectively modifying of the information associated with the lure data comprises modifying a name of the lure file.

27. The computerized method of claim 25, wherein the selectively modifying of the information associated with the lure data comprises modifying content of a directory within the file system, the content includes a sub-directory, a folder or a file located within the directory.

28. The computerized method of claim 25, further comprising analyzing the configuration information including a lure configuration file and determining (i) a number of lure files to be generated, (ii) a type of each lure file of the one or more lure files, (iii) characteristics of each lure file of the one or more lure files, and (iv) a location in the file system for each of the one or more lure files.

29. The computerized method of claim 25 further comprising:
   prior to processing the object received over a network, capturing a snapshot of a state of the file system including the lure data having the selectively modified information.

30. The computerized method of claim 29, wherein the determining whether the object exhibits file altering behavior includes a comparison of the state of the file system captured in the snapshot and a state of the file system after beginning processing the object.

31. The computerized method of claim 25, wherein the selectively modifying of the information associated with the lure data comprises adding one or more characters to a name assigned to the lure data.

32. The computerized method of claim 31, wherein the name of the lure data is modified into a pseudo-random name.

33. The computerized method of claim 24, wherein the logic, prior to placing the lure data within the system, performs an operation of configuring the system to replicate a file system of a particular endpoint device.

34. The computerized method of claim 24, wherein the lure data includes a lure file, the system includes a file system, and the system changes includes changes to the lure file that is associated with the file system.

35. The computerized method of claim 24, wherein the configuration information further includes at least one attribute of the lure data.

36. The computerized method of claim 35, wherein the selectively modifying the information associated with the lure data comprises modifying an attribute of the at least one attribute of the lure data.

37. The computerized method of claim 35, wherein the lure data is a lure file and the at least one attribute includes a name of the lure file.

* * * * *